(12) United States Patent
Thorwirth

(10) Patent No.: US 8,515,123 B2
(45) Date of Patent: Aug. 20, 2013

(54) EFFICIENT WATERMARKING APPROACHES OF COMPRESSED MEDIA

(75) Inventor: Niels J. Thorwirth, San Diego, CA (US)

(73) Assignee: Verimatrix, Inc., San Diego, CA (US)

( * ) Notice: Subject to any disclaimer, the term of this patent is extended or adjusted under 35 U.S.C. 154(b) by 225 days.

(21) Appl. No.: 13/002,280

(22) PCT Filed: Jul. 6, 2009

(86) PCT No.: PCT/US2009/049718
§ 371 (c)(1),
(2), (4) Date: Feb. 8, 2011

(87) PCT Pub. No.: WO2010/003152
PCT Pub. Date: Jan. 7, 2010

(65) Prior Publication Data
US 2011/0129116 A1    Jun. 2, 2011

Related U.S. Application Data

(60) Provisional application No. 61/078,322, filed on Jul. 3, 2008.

(51) Int. Cl.
*G06K 9/00* (2006.01)
*G06K 9/34* (2006.01)
(52) U.S. Cl.
USPC ........................................... 382/100
(58) Field of Classification Search
USPC ......... 382/100, 118–120, 212, 232, 248–250, 382/276, 280, 284, 293, 296; 380/54, 210, 380/252, 287; 713/176
See application file for complete search history.

(56) References Cited

U.S. PATENT DOCUMENTS

| 5,805,700 A | | 9/1998 | Nardone et al. |
| 5,832,119 A | * | 11/1998 | Rhoads ............... 382/232 |
| 5,946,414 A | * | 8/1999 | Cass et al. ........... 382/183 |

(Continued)

FOREIGN PATENT DOCUMENTS

| EP | 0897245 A2 | 2/1999 |
| EP | 1595257 | 11/2005 |

(Continued)

OTHER PUBLICATIONS

International Preliminary Report on Patentability and Written Opinion for Application No. PCT/US2005/043895, International Filing Date Dec. 5, 2005, 9 pgs.

(Continued)

*Primary Examiner* — Amir Alavi
(74) *Attorney, Agent, or Firm* — KPPB LLP

(57) ABSTRACT

Systems and methods are described for imperceptibly embedding information by identifying locations that can be imperceptibly modified by replacing original content using replacement content derived from elsewhere in the compressed bitstream to remove at least a portion of the original content, generating at least one piece of replacement data for each identified location, where overwriting a portion of the compressed bitstream with replacement data prevents a decoder from decoding original content due to decoding replacement content derived from elsewhere in the compressed bitstream, selecting pieces of replacement data using an embedding device, where overwriting portions of the compressed bitstream using pieces of replacement data encodes payload information in accordance with a predetermined coding scheme, and embedding the payload information in the compressed bitstream by using the embedding device to overwrite at least a portion of the compressed bitstream with the selected replacement data.

35 Claims, 12 Drawing Sheets

(56) References Cited

U.S. PATENT DOCUMENTS

| | | | |
|---|---|---|---|
| 6,141,753 | A | 10/2000 | Zhao et al. |
| 6,285,774 | B1 | 9/2001 | Schumann et al. |
| 6,359,998 | B1 * | 3/2002 | Cooklev ............... 382/100 |
| 6,415,031 | B1 | 7/2002 | Colligan et al. |
| 6,674,876 | B1 | 1/2004 | Hannigan et al. |
| 6,757,407 | B2 * | 6/2004 | Bruckstein et al. ........... 382/100 |
| 6,785,401 | B2 | 8/2004 | Walker et al. |
| 6,912,010 | B2 | 6/2005 | Baker et al. |
| 6,999,598 | B2 | 2/2006 | Foote et al. |
| 7,065,212 | B1 | 6/2006 | Yu et al. |
| 7,085,398 | B2 | 8/2006 | Baudry et al. |
| 7,266,466 | B2 | 9/2007 | Lemma et al. |
| 7,346,163 | B2 | 3/2008 | Pedlow, Jr. et al. |
| 7,386,148 | B2 | 6/2008 | Seroussi |
| 2002/0150239 | A1 | 10/2002 | Carny et al. |
| 2003/0140257 | A1 | 7/2003 | Peterka et al. |
| 2003/0145329 | A1 | 7/2003 | Candelore |
| 2003/0149879 | A1 | 8/2003 | Tian et al. |
| 2003/0174837 | A1 | 9/2003 | Candelore et al. |
| 2003/0188154 | A1 | 10/2003 | Dallard et al. |
| 2003/0190054 | A1 * | 10/2003 | Troyansky et al. ........... 382/100 |
| 2003/0228018 | A1 | 12/2003 | Vince |
| 2004/0010717 | A1 | 1/2004 | Simec et al. |
| 2004/0028227 | A1 | 2/2004 | Yu |
| 2004/0057581 | A1 | 3/2004 | Rhoads |
| 2004/0081333 | A1 | 4/2004 | Grab et al. |
| 2004/0091109 | A1 | 5/2004 | Son et al. |
| 2004/0125952 | A1 | 7/2004 | Alattar et al. |
| 2007/0052727 | A1 | 3/2007 | Rhoads |
| 2007/0053513 | A1 | 3/2007 | Hoffberg |
| 2009/0080689 | A1 | 3/2009 | Zhao et al. |
| 2009/0136087 | A1 | 5/2009 | Oren et al. |
| 2010/0027684 | A1 | 2/2010 | Zou et al. |
| 2011/0129116 | A1 * | 6/2011 | Thorwirth ............... 382/100 |

FOREIGN PATENT DOCUMENTS

| | | |
|---|---|---|
| EP | 1764780 | 3/2007 |
| WO | 2004114208 | 12/2004 |
| WO | 2007067168 | 6/2007 |
| WO | 2007072442 | 6/2007 |
| WO | 2007108795 | 9/2007 |

OTHER PUBLICATIONS

International Search Report for International Application No. PCT/US2009/49718, date completed Aug. 10, 2009, date mailed Aug. 25, 2009, 3 pgs.

Written Opinion of the International Searching Authority for International Application No. PCT/US2009/49718, date completed Aug. 11, 2009, date mailed Aug. 25, 2009, 9 pgs.

A. Jin et al., "Resynchronization and Remultiplexing for Transcoding to H.264/Avc", Univ. Science A, 2006 vol. 7 Suppl. I, pp. 76-81.

Aweke Lemma et al, "Secure Watermark Embedding through Partial Encryption", Y.Q. Shi and B. Jeon (Eds.): IWDW 2006, LNCS 4283, 2006, pp. 433-445.

B. Mobasseri et al., "Watermarking MPEG-2 Video in Compressed Domain Using VLC Mapping", ACM Multimedia and Security Workshop Aug. 2, 2005, pp. 1-21.

D.Zou et al., "H.264/AVC Stream Replacement Technique for Video Watermarking", Acoustics, Speech and Signal Processing, 2008. ICASSP 2008. IEEE International Conference on Mar. 31-Apr. 4, 2008, pp. 1749-1752.

F.Y. Duan et al., "A Short Summary of Digital Watermarking Techniques for Multimeda Data", pp. 1-10. 2005.

H. Liu et al., "Real Time Digital Video Watermarking for Digital Rights Management Via Modification of VLC", Parallel and Distributed Systems, 2005. Proceedings. 11th International Conference on Jul. 22, 2005, vol. 2, pp. 295-299.

I. Cox et al., "Facilitating Watermark Insertion by Preprocessing Media", EURASIP Journal on Applied Signal Processing 2004:14, pp. 2081-2092.

J. Foote et al., "Time Base Modulation: A New Approach to Watermarking Audio", pp. 1-4, 2004.

K. Sonoda et al., "Blind Detection of Watermarks Embedded by Periodical Phase Shifts", Acoust. Sci. & Tech. vol. 25, No. 1, 2004, pp. 103-105.

M. Celik et al., "Collusion-Resilient Fingerprinting by Random Pre-Warping", Signal Processing Letters, IEEE, Oct. 2004, vol. 11, No. 10, pp. 831-835.

Profrock et al., "H.264/AVC video authentication using skipped macroblocks for an erasable watermark", Visual Communications and Image Processing, Jul. 12, 2005, pp. 1-10.

Y. Mao et al., "Collusion-Resistant Intentional De-Synchronization for Digital Video Fingerprinting", Image Processing, 2005. ICIP 2005. IEEE International Conference on Sep. 11-14, 2005, vol. 1, pp. 237-240.

Z. Liu et al., "Direct Fingerprinting on Multicasting Compressed Video", 11th International Multimedia Modelling Conference 2005, pp. 76-83.

* cited by examiner

EFFICIENT WATERMARKING APPROACHES OF COMPRESSED MEDIA

This application is a 371 of PCT/US2009/049718 filed on Jul. 6, 2009 which claims benefit of 61/078,322 filed on Jul. 3, 2008.

FIELD OF THE INVENTION

The present invention relates to embedding and extraction of information in digital media, also called digital watermarking.

BACKGROUND OF THE INVENTION

Digital representation, storage, distribution, and duplication of digital media have become very popular because they are inexpensive, easy to use and maintain the quality of the media. These advantages however have enabled widespread, illegal distribution and use of copyrighted material, such as unauthorized distribution of digital images and videos over the Internet.

Many different approaches have been presented to secure digital media against unauthorized use. For example, digital encryption technology is effective to enable secure communication and delivery. However, if the encrypted bitstream is decrypted or presented in a form that is visible or audible to humans, that content can be re-recorded and an unsecured copy can be obtained.

Marking media by embedding recipient information in the media can help identify individuals that receive the media and use the content in an unauthorized manner. Further, embedded ownership information in the media can indicate copy restriction and clarify ownership of the media.

One way of marking media is by adding annotations to the digital media file format that can be read from the unmodified file and that are ignored during playback. This information is most often lost, however, if the file is re-recorded or converted to another format.

To achieve a robust and permanent mark in video media, visible and overlay images that display copyright information during playback have been proposed. Overlaid images are robust against modification and easy to read. However, this approach can reduce the quality of the marked video, because the overlaid images interfere with the original video, which diminishes the quality of the viewing experience. In addition, overlaid images are obvious and are therefore easy to identify, and can be removed by overwriting or cropping.

Digital watermarking is typically understood as the embedding of imperceptible, robust and secure information in media content. In the prior art, many different methods have been proposed on how to accomplish the embedding of a digital mark. While some methods provide a fairly strong solution in terms of robustness and imperceptibility, the challenge of efficient application remains. Watermarking typically requires modification of many elements that encode data, such as audio samples or pixels in a frame or image of the media object, which is processing intensive. In addition, many watermarking applications require the modification of many media objects, for example to enable distribution of unique copies of the same content to millions of recipients. To uniquely process many media objects before delivery, a very efficient process for applying a watermark is desirable. Alternatively, a marking process may be applied by a receiving device. These devices however are often very limited in available processing resources and again, a very efficient system for performing watermarking is desirable.

Direct modification of the bitstream representing the compressed (also called encoded) content is required in applications that require embedding without re-compression (re-encoding). These applications do not allow access to the decoded video content because a decode, marking and re-encode of the content is too processing intensive, introduces processing delay and often reduces the quality of the video at least slightly. Examples of applications where embedding information in compressed content is desirable include embedding on a server that distributes uniquely marked copies to recipients in compressed form and applications on the receiving end where the compressed content is marked before storage, or fed into a hardware decoder and display engine that can not readily be modified to add watermarking functionality after the content is decoded.

Manipulation of compressed content provides a particular challenge, because it is complex to predict how a modification will affect the resulting decoded content, since multiple operations are applied that convert the compressed content to the uncompressed content. Another challenge is the underlying compression principle of re-using prior encoded information and thereby reducing redundancy. This means that elements that are modified are often re-used and modification will therefore propagate to additional locations, often resulting in unwanted effects that interfere with the desired imperceptibility of the embedded information. In prior art, concepts have been described that work on partly compressed content in that some stages of the compression, such as the entropy coding, are performed before modifications can be applied. While this offers some advantages in processing, it is often insufficient to comply with very limited processing restrictions present in many applications.

SUMMARY OF THE INVENTION

Systems and methods in accordance with embodiments of the invention use principles applied during compression to efficiently embed information in compressed content by applying small modifications that result in significant modification of the decoded content. In many embodiments, the modifications are readable after degradation of the content and are imperceptible after decoding.

One embodiment of the invention includes analyzing the compressed bitstream using a pre-processor to identify locations that can be imperceptibly modified, where the imperceptible modification includes replacing original content using replacement content derived from elsewhere in the compressed bitstream to remove at least a portion of the original content, generating at least one piece of replacement data for each identified location using the pre-processor, where overwriting a portion of the compressed bitstream with any of the pieces of replacement data prevents a decoder from decoding original content and causes a decoder to decode replacement content derived from elsewhere in the compressed bitstream, selecting pieces of replacement data using an embedding device, where overwriting portions of the compressed bitstream using the selected pieces of replacement data encodes payload information in accordance with a predetermined coding scheme, and embedding the payload information in the compressed bitstream by using the embedding device to overwrite at least a portion of the compressed bitstream with the selected replacement data.

In a further embodiment of the invention, the embedding device is a media server configured to transmit the compressed bitstream to a decoder, and further includes generating payload information using the media server, where the payload information is indicative of a decoder that requests the transmission of the compressed bitstream, and transmitting the compressed bitstream in which the payload information is embedded to the decoder using the media server.

In another embodiment of the invention, the embedding device is a decoder configured to receive the compressed bitstream and the replacement data, and the method further comprises decoding the video in the compressed bitstream after the decoder has embedded the payload information, and outputting the decoded video to a rendering device using the decoder.

In a still further embodiment of the invention, analyzing the compressed bitstream using a pre-processor to identify locations that can be imperceptibly modified further comprises identifying portions of video frames from within the compressed bitstream that can be imperceptibly modified, where the imperceptible modification includes replacing a portion of the original content of the video frame using replacement content derived from other frames in the compressed bitstream.

In still another embodiment of the invention, analyzing the compressed bitstream using a pre-processor to identify locations that can be imperceptibly modified further comprises identifying video frames that can be imperceptibly modified, where the imperceptible modification includes replacing the original content of the video frame using replacement content derived from at least one other frame within the compressed bitstream.

In a yet further embodiment of the invention, the replacement data and at least a portion of the compressed bitstream are encrypted using at least one common encryption key so that the encrypted compressed bitstream can be overwritten with replacement data and the compressed bitstream decrypted.

Yet another embodiment of the invention includes analyzing the compressed bitstream using a pre-processor to identifying video frames that are not referenced by other video frames in the compressed bitstream and which can be imperceptibly modified without propagating errors to other locations in the compressed bitstream, where the imperceptible modification includes replacing the original content of the video frame using replacement content derived from at least one other frame within the compressed bitstream, generating at least one piece of replacement data for each identified video frame using the pre-processor, where overwriting a portion of the compressed bitstream with any of the pieces of replacement data prevents a decoder from decoding the original content of the identified video frame and causes a decoder to derive a replacement frame from at least one other frame within the compressed bitstream in a manner indicated by the replacement data, selecting pieces of replacement data using an embedding device, wherein overwriting the compressed bitstream using each of the selected pieces of replacement data replaces an entire frame and encodes payload information in accordance with a predetermined coding scheme, and embedding the payload information in the compressed bitstream by using the embedding device to overwrite at least a portion of the compressed bitstream with the selected replacement data.

A further embodiment again of the invention includes inspecting the copy of the marked bitstream to estimate the locations within the original bitstream that were overwritten using an extraction device, and extracting the payload information embedded in the copy of the compressed bitstream based upon the predetermined coding scheme, and the estimates of the locations within the original bitstream that were overwritten using the extraction device.

Another embodiment again of the invention includes a pre-processor configured to communicate with a storage device, where the pre-processor is configured to receive the compressed bitstream, analyze the compressed bitstream to identify locations that can be imperceptibly modified, where the imperceptible modification includes replacing original content using replacement content derived from elsewhere in the compressed bitstream to remove at least a portion of the content, generate at least one piece of replacement data for each identified location, where overwriting a portion of the compressed bitstream with any of the pieces of replacement data prevents a decoder from decoding original content and causes a decoder to decode replacement content derived from elsewhere in the compressed bitstream, and store the replacement data corresponding to each identified location on the storage device.

A further additional embodiment of the invention includes an embedding device configured to receive the compressed bitstream and the pre-processed replacement data, where the embedding device is configured to select pieces of pre-processed replacement data, wherein overwriting portions of the compressed bitstream using the selected pieces of replacement data encodes payload information in accordance with a predetermined coding scheme, and the embedding device is configured to embed the payload information in the compressed bitstream by using the embedding device to overwrite at least a portion of the compressed bitstream with the selected replacement data.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
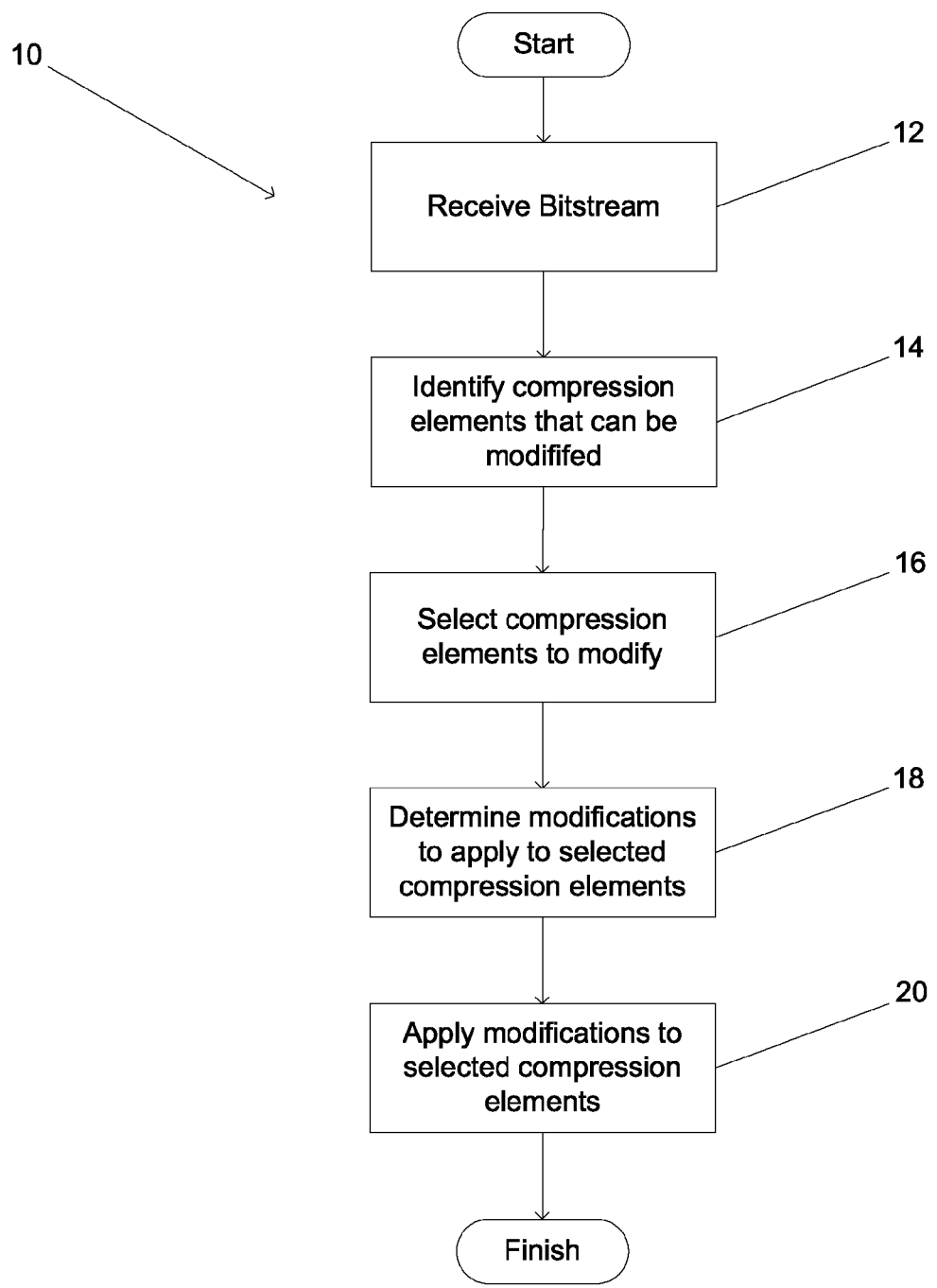
FIG. 1 is an illustrative flow diagram of the embedding procedure, according to one embodiment of the invention.

Turning now to the drawings, systems and methods for embedding watermarks in compressed content in accordance with embodiments of the invention are illustrated. In a number of embodiments, marking is achieved using small modifications of the compressed content that introduce a strong, yet imperceptible modification to the content. In many embodiments, information of the original video content is overwritten and replaced by other content in the bitstream. This replacement is efficiently implemented by referencing other information in the bitstream, also called reference content. This is typically done with operations utilized in many compression formats that copy information from reference frames or reference blocks. Reference frames are frames that can be referenced from an encoded frame. MPEG-2 b frames can reference several frames. Macroblocks in H.264 can reference other macroblocks to copy information from them. The actual information that is embedded in the bitstream in accordance with the embodiments of the invention is expressed by the removal of content and overwriting with reference content. Information can be conveyed based upon the location of the modifications and/or based upon the particular modifications made to the compressed content. The selection of modifications depends on the compression format and media content. In a number of embodiments, modifications are applied by replacing entire, self-contained, compression units that are independent from other compression units and can be replaced without error propagation to other compression units during decoding. Decoding here also includes the display of frames, e.g., some frames may be decoded into images but not displayed when the timing information is replaced as detailed below. In many embodiments, the compression units are entire frames and the modification can involve dropping of frames, or the substitution of frames. In several embodiments, the compression units are other elements of the compressed bitstream including but not limited to image macro blocks, video slices (e.g., in H.264), video fields, audio samples or audio frames. The compression units are replaced with default replacement units that are independent of the structure of compression units in the bitstream, allowing for very efficient determinations of suitable replacement compression units without the need to analyze the structure of the replaced compression units. Furthermore, the replacement compression units are typically smaller than the replaced compression units, by using the efficiencies of the compression format. Therefore the compression units can be replaced without increase in file size and the replacement units allow for efficient transmission to the embedding location. The actual embedding of information can then be performed at a second location, using conditional replacement, subject to the information to be embedded. The embedding can be performed extremely efficiently using copy operations to overwrite compression units with replacement compression units generated during the pre-processing stage. The introduced modifications are robust and detectable in the video after transformations such as decoding and re-encoding to another compression format.

Imperceptibly Embedding Information

Systems and methods in accordance with embodiments of the invention can embed information in a compressed bitstream by modifying compression elements within the bitstream. A process for embedding information in a bitstream is shown in FIG. 1 in accordance with an embodiment of the invention. The process 10 includes receiving a compressed bitstream 12. The bitstream is analyzed to identify (14) compression units within the compressed bitstream that can be independently modified without affecting other compression units within the bitstream and without noticeable artifacts. A number of the compression units that can be modified are selected (16) for modification and the modifications that can be made to the compression units are determined (18). Pre-processing can be used to generate replacement data that can be stored as part of the compressed bitstream or separately from the compressed bitstream. The modifications can be efficiently applied (20) to imperceptibly embed information within the bitstream. The application of the modifications can occur when the compressed bitstream is transmitted or played back. In a number of embodiments, information is embedded in the bitstream by the selection of the specific compression units that are modified. A set of criteria can be defined concerning compression units that can be imperceptibly modified. Information can be expressed by the decision of whether to modify a compression unit that matches the criteria for modification or to leave it unmodified. In several embodiments, information is embedded in the bitstream by the choice of the specific compression units that are modified. In many embodiments, information is embedded in the bitstream both by the selection of the specific compression units that are modified and by the choice of the specific modifications made to the selected compression units. Selection of compression units to modify and types of modifications that can be performed are discussed further below.

Modifying Compression Units

Any of a variety of compression units can be modified to embed information in accordance with embodiments of the invention. Compression units are elements of the compressed bitstream. In many embodiments, the compression units that are modified are entire frames. In several embodiments, smaller compression units of a bitstream are used to embed information including, but not limited to image macro blocks, video slices (e.g., in H.264), video fields, Group of Picture, audio samples or audio frames. In a number of embodiments, larger compression units of a bitstream are used to embed information including, but not limited to entire groups of pictures. In many instances, a single type of compression unit is modified to embed information. In other embodiments, multiple classes of compression unit are modified to embed information.

A benefit of embedding information by modifying entire compression units is the ability to easily manipulate a bitstream in the compressed domain without the need to understand dependencies within the compression unit. The required manipulation can often be expressed by replacing the compression unit with a small amount of data, using the efficiency of the compression format and the resulting effect and robustness can be significant. Furthermore, the positioning of compression units such as video frames is typically readily observable from the compressed bitstream. If modifications of compression units result in the same decoded video when different implementations of decoders are used, and the modifications are robust and secure, the modifications can embed information in an efficient manner as a digital watermark. Which modifications result in robust, secure, and imperceptible embedding of information depends on the compression and media format and media content.

In order to avoid uncontrolled error propagation during decoding, modifications are typically applied to entire, self contained, compression units. Compression units are self-contained (i.e., independent) when they are not re-used in subsequent compression units. The types of compression units that are independent depends on the compression format. Some compression units are sometimes not re-used, depending on content, encoder and encoder setting. For example, a 'B' frame in the MPEG-2 format specified by the Moving Picture Experts Group of the ISO/IEC for example is not used for further prediction of other frames. In the H.264 compression standard, frames that are not used for further prediction are commonly called 'b' frames while 'B' frames also exist, which can be used for further prediction. In contrast, information in other frame types, such as 'I' and 'P' frames may be used in other frames.

Techniques for Modifying Frames of a Compressed Video Stream

One approach of modification of a compression unit is the dropping of a frame of video. The approach relies upon similarity between adjacent frames in a sequence to introduce modifications to the sequence that are imperceptible to a human viewer. A dropped frame in accordance with embodiments of the invention can take one of a number of forms including, but not limited to deleting the dropped frame, or replacing the dropped frame also called skipped frame. As is discussed further below, the frame used to replace a skipped frame can be generated in a variety of ways. In a number of embodiments, the replacement frame is generated using information from one or more adjacent frames. In several embodiments, the replacement frame is generated using information from one or more adjacent frames and additional embedded information, also called delta additions in this description.

Frame Deletion

The process of dropping a frame by deleting a frame in a video bitstream is straightforward. The deleted frame is removed from the bitstream. By way of example, dropping a frame through deletion converts a four frame sequence A,B,C,D to a 3 frame sequence A,B,D. In many embodiments, the accumulation of deleted frames is used to increase the difference between marked and unmarked versions of a piece of content and to facilitate extraction as the original and marked copy are several frames apart in some locations, increasing the difference between the two and hence making the marking of the content easier to observe. The accumulated difference can later be compensated by adding frames or can be used to observe the total playback time as an individual mark.

In yet another embodiment, the accumulation and deletion of frames is used to create a difference between the audio and video track that can be used to observe a manipulation to the video, even without the presence of the original content for comparison.

Frame Replacement

A technique for dropping a frame by replacement, also called frame skipping in this description, involves displaying an adjacent frame in place of a dropped frame. By way of example, dropping a frame using a frame skip can involve replacing the dropped frame with its previous frame, which converts a four frame sequence A,B,C,D to A,B,B,D when dropping frame C. In another example, dropping a frame using a frame skip can involve replacing the dropped frame with the following frame, which converts the four frame sequence A,B,C,D to A,B,D,D when dropping frame C.

Another technique for dropping a frame by replacement involves replacing the dropped frame with a frame that is generated by merging neighboring frames. By way of example, a frame from the four frame sequence A,B,C,D can be dropped by generating a merged frame BD from the elements of frames B, and D and inserting the merged frame in place of the frame C to produce the four frame sequence A,B,BD,D. BD can be an pixel by pixel average of B and D or contain some parts from frame B and others from frame D.

A further technique for dropping a frame by replacement is to replace a dropped frame with a prepared frame. By way of example, the prepared frame X can be used to convert a frame sequence A,B,C,D to A,B,X,D. In a number of embodiments, the prepared frame is blended with an adjacent frame to imperceptibly embed information in the replacement frame. One process for generating a replacement frame including imperceptibly embedded information is through the use of delta additions, which is discussed further below.

Replacement Frames Containing Embedded Information

The concept in compression of reusing nearby information allows for the possibility of dropping a frame and using a replacement frame that is a copy of the previous frame (or other frame derived from frames close to the dropped frame) modified to include delta additions, by using error residuals. The delta additions can apply human or machine readable, visible or imperceptible watermark patterns to the copied frame in the frequency or spatial domain. Furthermore, the delta additions can be shaped as characters, dots or pseudo random patterns. Delta additions that introduce strong modifications are unlikely to be perceptible if displayed for a very short period such as a single frame only. In a number of embodiments, a replacement frame is encoded by overlaying a delta addition pattern on a copy of a neighboring frame. The replacement frame can typically be efficiently compressed and the modification to the bitstream is smaller than the original frame to be overwritten. The embedding of information on a copy of previous information using delta additions can have particular advantages during extraction (as is explained in P.C.T Application Serial No. PCT/US2008/084840).

Figure 2:
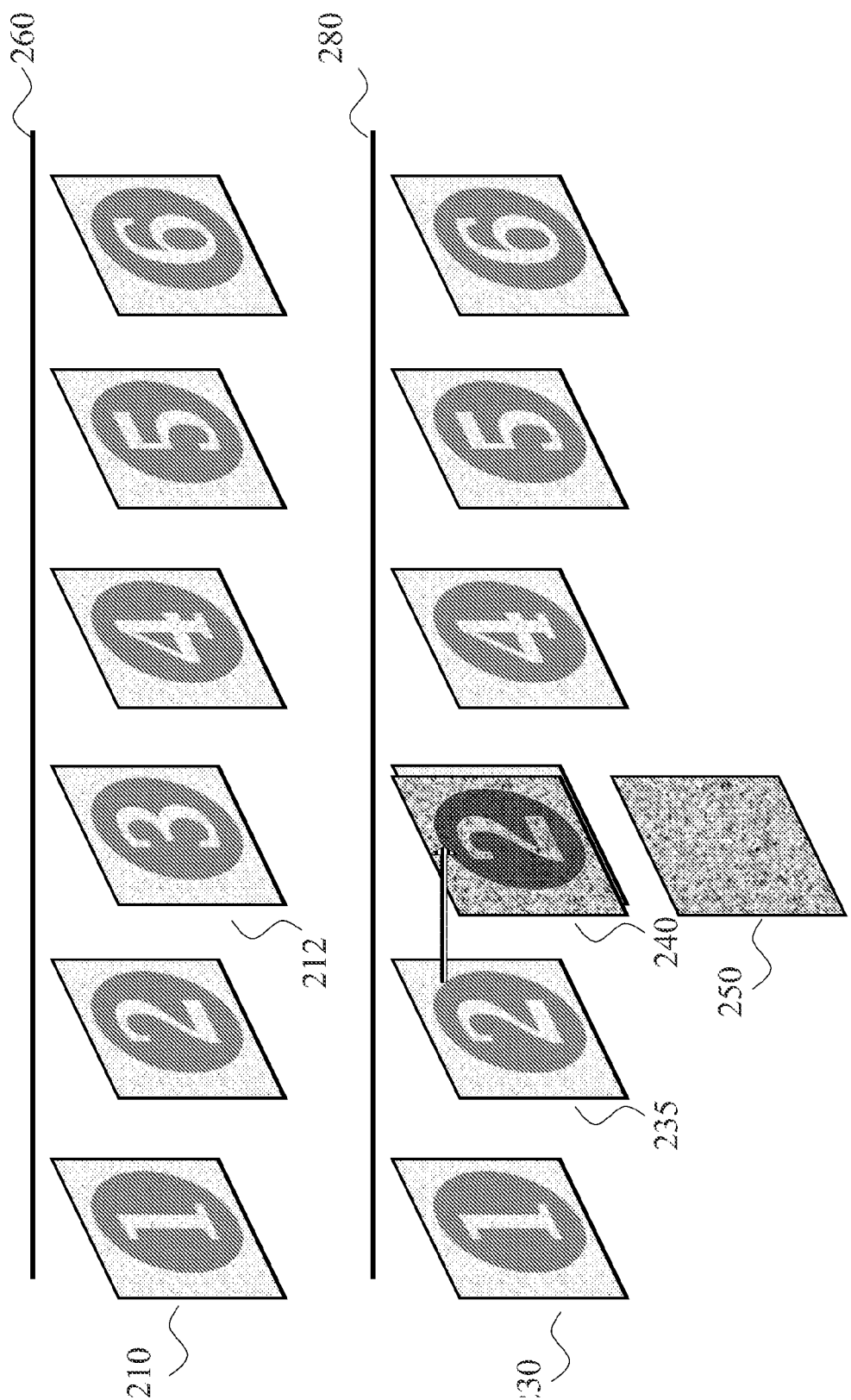
FIG. 2 conceptually illustrates a process for dropping a frame using a replacement frame containing delta additions in accordance with an embodiment of the invention.

A process for dropping a frame using a replacement frame containing delta additions in accordance with an embodiment of the invention is shown in FIG. 2. An unmodified bitstream that includes a regular frame sequence (210) is shown in comparison to the frame sequence (230) of a modified version of the original (i.e., unmodified) bitstream that contains a duplicated compression unit (235), overwriting the frame '3' (212). The duplicate compression (240) unit is derived from the previous frame '2' (235) and also contains an added delta pattern (250). This delta contains watermark information and can be restored as the difference or delta between the duplicate compression unit (240) and the previous frame (235).

Encoding Replacement Frames

The manner in which a frame that is used to replace a dropped frame is encoded depends upon the nature of a replacement frame and the encoding scheme used to encode a bitstream. When frame skipping is used to drop a frame, the replacement frame is typically assembled from frames adjacent the dropped frame, using video compression elements, that copy information from adjacent frames. Therefore, the frame can be efficiently encoded. When delta additions are used, additional information is added to the skipped frame using error residuals that add information to the frame assembled from its adjacent frames.

Frame Skipping in MPEG-2 and H.264

On a frame level for MPEG-2 and H.264 compressed content, a skipped frame can be applied by replacing a compressed frame with a frame of the same dimensions that contains macroblocks with zero length motion vectors from the previous frame, such that for each macroblock the information from the previous frame is copied, resulting in a skipped frame consisting of a copy of the previous frame.

In H.264 the sequence of identical motion vectors can be expressed very efficiently using one of two available mechanisms.

One way to express a skipped frame is by marking each macro block as skipped, and using CABAC (Content Adaptive Binary Arithmetic Coding) encoding, or encoding a skip run the size of all macroblocks when using CAVLC (Context Adaptive Variable Length Coding) encoded frames. The selection of CABC or CLVLC compression can be made on a frame by frame basis and can be part of the applied modification in order to select the more efficient encoding and to keep the information that is overwritten to a minimum. In H.264, simple flags, i.e., data elements in the bitstream provide information on how a skipped macroblock is reconstructed; it can be set to reconstruct the macroblock from a preceding frame, as the average of two frames or as a weighted average. These variations can be used to either make the skipped frame less visible or alternatively to encode additional information in the skipped frame by choosing the replacement method depending on the information to be embedded.

Some of the compression units involved in modifying an H.264 encoded frame are discussed below.

If the frame is encoded with CAVLC, the number of macroblocks to be skipped is set using the skip_run parameter that indicates how many of the following macroblocks are to be skipped. To create a skipped frame that contains exclusively skipped macroblocks, the number of total macroblocks in this frame to be skipped is one run. The skip_run value allows for very efficient coding of a skipped frame and therefore it is often more efficient to compress a skipped frame using CAVLC. If CABAC is used, the skip flag is set to true for all macroblocks and the frame is CABAC encoded. The CABAC encoding will reduce the coded size significantly but, with common frame sizes, the frame will still require more data to be encoded than a skipped CAVLC frame. If it is important to keep the amount of data to be replaced to a minimum, the coding scheme for the replacement frame may be changed from CABAC to CAVLC. The coding scheme of the frame is indicated in a picture parameter set (PPS) by the entropy_coding_mode_flag flag. A PPS can be referred to by several different frames that use the same picture parameters. The pre-processing step may introduce a PPS that specifies the CAVLC encoding scheme and that can be referred to by the replaced frame. To introduce a new PPS, identified through a different pic_parameter_set_id number, the bitstream may be extended or, if a large number of picture parameter sets is present in the original bitstream many of them are redundant and some of them may be overwritten to specify CAVLC parameters. To indicate how the skipped macroblocks are used, the weighted_bipred_idc value is modified in the PPS.

To mark the remainder of a frame as private data, it is followed by a NALU that is marked as private or reserved data. There may be subsequent NALU units that encode additional slices of the frame. If the replacement frame already defined the entire frame, then these remaining NALUs also need to be to be ignored by a decoder and are therefore marked as private data.

The modifications that are applied to a frame in the examples above, can be applied to other elements such as slices. For H.264 a frame can be divided in several slices that have their own header information. Therefore slices are also well suited to be modified as compression units. The ability to exchange complete compression units is one particular advantage of the described invention as it significantly reduces the complexity involved to manipulate advanced and complex compression schemes such as CABAC encoded H.264 content.

Encoding Delta Additions

A process similar to the process used for frame skipping can be used to encode delta additions in a replacement frame. In addition to the copy operation of adjacent frames, the frame contains delta additions encoded as error residuals. Error residuals is an expression for information that can not be reconstructed from referenced frames. For regular encoded frames information is borrowed from referenced frames and differences in the reconstructed frames that can not be perfectly copied from the referenced frame are encoded as error residuals, they are encoded the difference between the referenced information and the information in the reconstructed frame. In some embodiments these error residuals are used to add information to the copied replacement frame.

Imperceptibly Embedding Information by Frame Dropping

Figure 3:
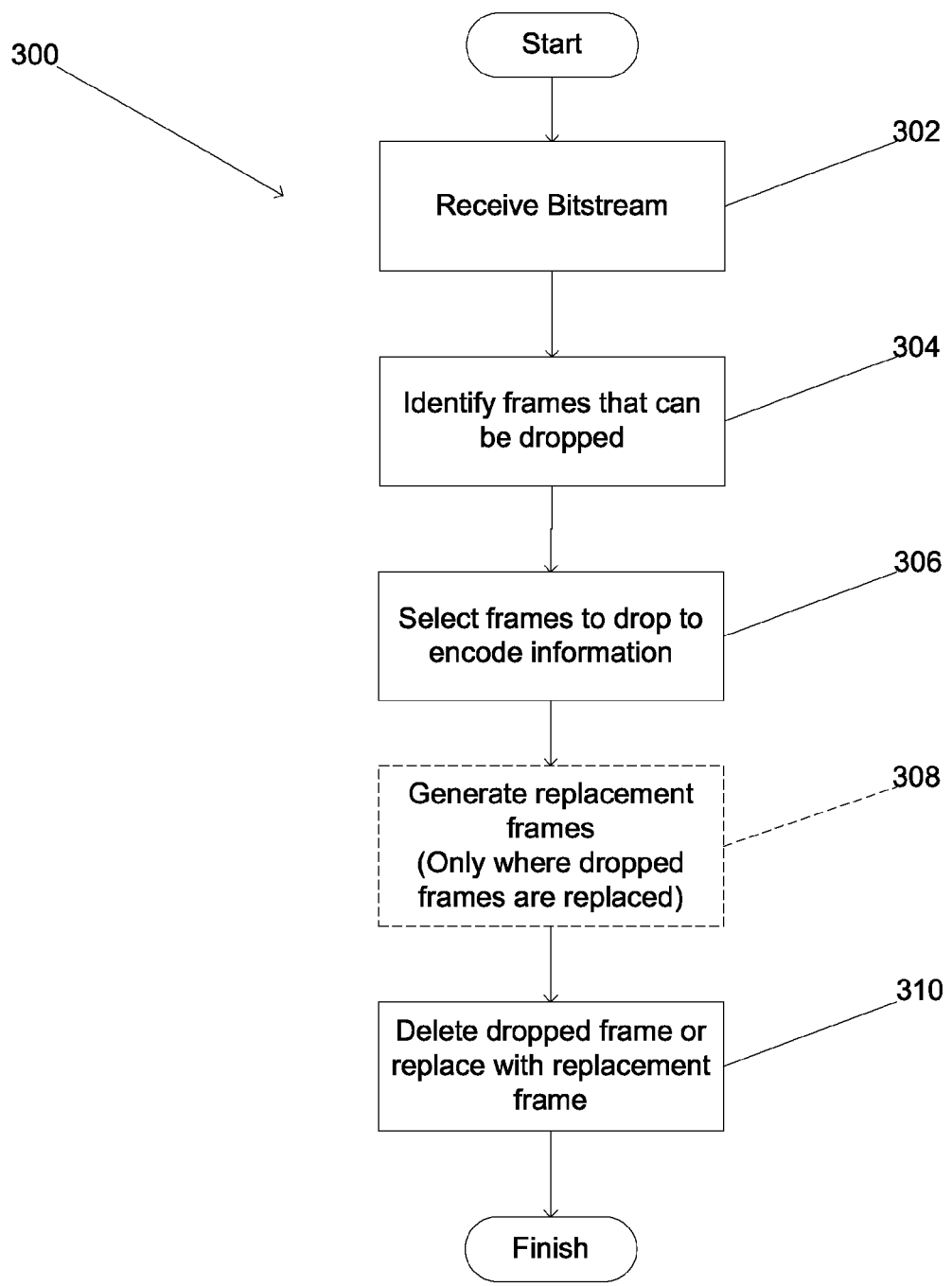
FIG. 3 is a flow diagram illustrating a process for imperceptibly embedding information in a compressed bitstream using frame dropping in accordance with embodiments of the invention.

Information can be imperceptibly embedded in a compressed bitstream by encoding the information using frame dropping. A process for encoding information using frame dropping in accordance with embodiments of the invention is illustrated in FIG. 3. The process 300 includes receiving (302) a bitstream and identifying (304) frames within the bitstream that can be imperceptibly dropped to encode information. Frames are selected (306) from the identified frames, the dropping of which encodes a specific piece of information in the bitstream. If frames are replaced, replacement frames are generated (308) and stored. At the time the bitstream is marked, the frame is either deleted or replaced (310) using the replacement frame that has been stored. The dropping of frames marks the bitstream with information that can be recovered by determining which frames were dropped.

Variations of Modifications to Encode Information

The modification of compression units, for example by frame dropping, can be used to embed binary values depending on the presence or absence of modifications. In many embodiments, N-ary values are encoded in a compressed bitstream using the position of modifications. For example, a decimal digit can be encoded by modifying one element out of 10 possible elements to be modified. Longer intervals reduce the amount of required modification but make the modification harder to detect as a decision has to be made for each of N possible locations and all decisions have to be correct to retrieve the information. An additional way to embed higher order numbers is by variation of the kind of modification that is applied. For example, the direction and amount of a shift in position can be used, e.g., if the replacement frame is copying its neighbor frame and adds a position shift to 1 of 10 possible locations, a decimal digit can be encoded. This is implemented by using motion vectors that are identical and non null such that the frame that is copied to replace the skipped frame is in a different location and shifted the length of the motion vector in the direction of the motion vector. Another example is to copy selected macroblocks from neighboring frames only. Information can be embedded by choosing which frame to copy information from and which macroblock to replace. In a concrete example, the upper left macroblock can be copied from a pre-determined preceding reference frame to encode a 0, from a following reference frame to encode 1 and left unmodified to encode 2. This method is applied for groups of macroblocks to increase the resulting difference in decoded frames between the embedded values. In the H.264 compression formats slices can be used which effectively group macroblocks into frame components. These different levels of encoding can be used at the same time and combined to store different data, data of different importance and/or data for error correction purposes.

Frames that are skipped are typically composed of skipped macroblocks. Skipped macroblocks are not encoded with picture information but filled with default values during decode. What the default value is can be set for a group of macroblocks, such as a H.264 slice, frame or picture. Defaults can be a copy from a another reference frame, an averaged copy of several selected reference frames, a weighted copy of several selected reference frames or a copy from a reference frame with a fixed displacement expressed as a non null motion vector. Each of these variations allows encoding of data. The data encoded is a number within the allowed range of modification. E.g., a binary digit can be encoded for the decision if the copy is from one frame or a weighted average and the weight of the average can encode information up to the range of the resolution of the weights (10 different weights to encode a decimal digit). The ability to embed binary values using frame dropping and/or N-ary values enables the embedding of almost any type of information within the bitstream subject to the number of available positions in which a frame can be dropped. In a number of embodiments, the watermarking information that is embedded contains error detection and/or error correction code.

The information on what modifications can be applied, how they are selected, how redundancy is added through repetition like error correction and/or error detection as well as the distribution of bits in the bitstream is typically expressed in an encoding scheme, that is pre-defined and used during embedding and extraction in the same fashion. It can be defined per user, movie, content distributor, and content owner or signaled with a marking in the content.

In many embodiments, the embedded information is robust against modification and can be retrieved from a copy that has undergone modifications such as re-compression. In several embodiments, in order to extract the embedded information, the location and nature of the modification is determined by comparison with the original, unmodified content.

Identifying Potential Frames to be Dropped

The dropping of compression units such as frames is suited for imperceptible embedding of information as the modifications introduced by the frame drops are similar to distortions that frequently occur during regular video processing. Consequently, consumers are accustomed to the distortions likely to be introduced by the frame drops and are unlikely to consciously register the distortions. The difference between neighboring frames can be significant and, therefore, the modifications introduced by a frame drop can often be strong compared with conventional watermarking techniques. The term strong here refers to the amount of information that is changed by the marking process. In general, a stronger mark embeds information more robustly, but is more likely to be observed. The strength of the modifications typically correlates with the level of redundancy required to recover information in a given application. For example, high levels of redundancy are desirable when attempting to recover weakly embedded information.

Even with few frame drops, it is still desirable to minimize the visible impact of the number of frame drops on the marked media. In a number of embodiments, embedding locations are chosen that have a minimal visible impact, while ideally altering the content sufficiently to allow extraction of the data even after degradation of the marked content. Modification can be minimal as measured by the difference between the original frame and the dropped frame but are typically also minimal in time, since the frame is displayed for a fraction of a second in common video frame rates.

Perceptual Shaping

The purpose of perceptual shaping is to ensure that the modifications applied when embedding a mark remain imperceptible to the common viewer. While they may be perceived by experts trained in judging video quality or experts who are familiar with the modifications applied, they are typically not noticeable or obvious to an untrained casual observer.

One principal measurement for the perceptibility of an introduced alteration is the difference between the unaltered and the altered content. For a skipped frame it is the difference between the frame and the previous frame that is displayed in its place. A variety of different measurements for the difference between two frames can be applied when selecting compression units that can be imperceptibly modified in accordance with embodiments of the invention including, but not limited to the absolute sum of differences of corresponding pixels, which is a simple but effective approach. A histogram stretch before comparison is useful to simulate the actual perception (e.g., variations from black to dark gray will be more readily observable in a very dark scene than in a scene that contains light and dark components). This and similar transformations are designed to adjust the difference between human perception and mathematical difference measures of content comparison. In a number of embodiments, those frames that provide a difference that is large enough to later detect the modification, yet small enough to remain imperceptible are selected as suitable candidates for replacement during an information embedding process. Another location to hide skipped frames from being noticeable is in areas that contain a local discontinuity such as scene changes, during which the content changes so rapidly that a skipped frame is not noticeable. These locations can be identified through a simple measure of high differences between frames that can be measured with the average of the absolute difference of corresponding pixels. A value greater than 30 indicates a strong change in between frames. The workflow of the identification of embedding locations can be described as follows:

1. Determine a robustness value R expressing the desired strength of the embedded mark between 8 and 20;
2. Create a list of all frames sorted by imperceptibility when being skipped.
3. Add all frames and their 2 closest neighbors to the list if the frames have an average absolute pixel difference of more than 30 to the previous frame;
4. Apply a histogram stretch to all frames; and
5. Add all other frames that have an average squared pixel difference to the previous frame greater than R to the list in the order of that average squared pixel difference.

The above list is independent of the compression codec used. From the compressed content, those frames are selected that allow skipping, given the way they are compressed, e.g., they can be skipped if they are 'b' frames, but not if they are 'I' frames. The list is sorted by how imperceptible the skipped frames will be and the selection strategy will prefer those frames that are less visible. This procedure is applicable when the entire file can be processed. If this is not the case, the values for low motion scenes are not sorted but selected by comparing to a threshold value. Although a specific process is described above, other processes for selecting frames that allow skipping in accordance with embodiments of the invention can be used.

Comparisons on a pixel level can be tolerated in many applications, however, such comparisons are processor intensive and involve decoding video frames in the bitstream. For other applications, it is desirable to deploy a quicker scheme to derive information about potential artifacts of modifications. In a number of embodiments, information that is contained in the compressed bitstream that contains aggregated information derived from content properties is used to determine the perceptual impact of a modification. As described in the literature, an alternative means for the comparison is performed in the frequency domain and can treat lower and higher frequencies or color vs. luminance with different weights for comparison. The content is often available in the frequency domain in its compressed or partially compressed state.

Selecting Embedding Locations Based Upon Frame Size

The size of a frame in the compressed format as a relative value to its frame compression type (such as I,B,P frames for MPEG video) indicates the information content and complexity of the frame. Compressed frames that contain more data are more likely to be noticeable when dropped. Conversely, compressed frames that use information from neighboring frames and that contain a comparatively small amount of data will be less noticeable when dropped. Frames that do not use neighboring information, are generally larger, where many frequencies, often found in complex scenes are found. Frames that contain many frequencies can be useful to embed a strong mark, because very complex scenes can mask the embedding distortions.

Variation of frame sizes over time can also be observed in performing perceptual shaping. Frames that borrow information from other frames, such as MPEG B frames, change in size whenever the characteristic of the scene changes. For example, the size of the frames will change as a scene changes from one scene to another, at the start of a motion, or a change in light levels. Therefore, the size of frames that borrow information from other frames can be an important indicator of locations in the bitstream suited to masking embedding modifications. Another way to estimate a scene change based upon frame size is to observe continuity in the average of the size of a predetermined number of preceding frames.

Selecting Embedding Locations Based Upon Frame Sequences

The sequence of the frame types provides other clues about the content and is fairly easily accessible in the compressed content. It follows a regular structure most of the time, called GOP structure (GOP: Group of Pictures). The GOP spans several pictures starting with an I frame, to the next I frame. It may, in many compression formats, vary if needed. The variation of the GOP structure and derivation from the regular pattern often signals a discontinuity in the content such as a scene change or other strong change, because in this case it is efficient to start with a new I frame. These positions are well suited to imperceptibly encode modifications since the presence of a strong change in content will perceptually mask the relatively small modification introduced by the modification applied with the mark.

Choosing Location Based Upon Motion Vectors

Yet another piece of relatively easily accessible information contained in many video compression formats is motion vector data that specifies spatial shifts for the reuse of information in other frames on a block basis. Motion vectors are used in compression, because they enable an encoded frame to efficiently reuse information encoded in temporally close frames. Interpretation of the motion vectors can provide clues as to the direction intensity and uniformity of motion between frames. When a frame is dropped to embed information, a minimum degree of motion is required in order for the dropping of the frame to have a detectable impact and the intensity or strength of the motion should not exceed a threshold in order to limit visible artifacts. The uniformity of the motion vectors indicates if the frames differ by many moving elements like a group of people or is derived from a uniform motion like panning or zooming. For many scenes, uniform motion will exhibit noticeable discontinuities when frames are skipped and are therefore less suitable to be chosen as an embedding location.

Selection of Locations in which to Embed Information

As discussed above, locations in which information can be embedded can be ascertained by reviewing the characteristics of the bitstream and identifying compression units possessing predetermined characteristics identifying them as suitable for imperceptibly embedding information. However, many embodiments of the invention involve determining compression units to modify and only modifying the compression units in the event that a subsequent determination is made that the compression units are suitable for modification.

Obfuscating Location of Modified Compression Units

Security of information embedded in a bitstream in accordance with embodiments of the invention can be enhanced by obfuscating the embedding locations such that they cannot be estimated and attacked directly. In order to do so, the relevant embedding locations are chosen from all possible embedding locations using a secret key that is required to derive the locations and to read, modify or write the embedded information. Alternatively or additionally, the locations can be made content dependent by using information from the original file as a key. To ensure that a potential attacker does not have access to that information, it might include data that is overwritten during the watermarking procedure and the original content is required for its recovery.

Extraction of Embedded Information

In a number of embodiments, information embedded in the content through the modification of compression units is extracted using a non-blind or informed extraction that compares the original, unmarked content with a copy that contains the mark, in order to identify differences between them. When the modifications involve frame dropping, the extraction process knows the locations that have possibly been altered and compares the original with the marked copy frame by frame to identify compression units that have been modified in order to embed information.

In many embodiments, the extraction process is blind and proceeds by estimating the appearance of the original bitstream. In a number of embodiments, knowledge of the modification procedure is used to identify compression units that are likely the product of a modification.

Non-Blind Extraction Processes

Figure 5:
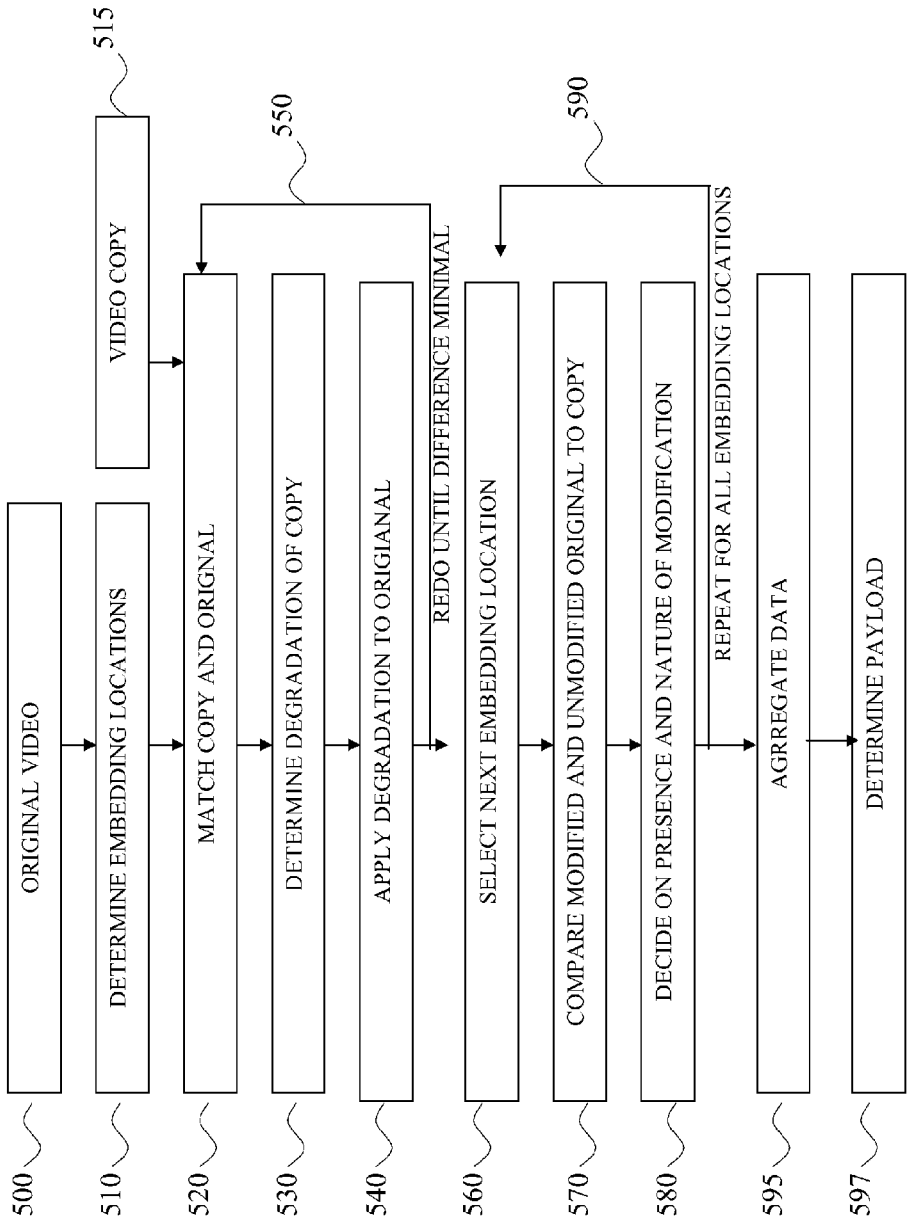
FIG. 5 is a flow diagram illustrating a process for non-blind extraction of information embedded by modifying compression units in accordance with an embodiment of the invention.

Many embodiments such as the embodiment illustrated in FIG. 5, require the original encoded bitstream (500) to be present during extraction, when the message that has been encoded in the stream is retrieved. This is in particular relevant if the content has undergone transformations such as analog conversion or re-compression. During such modifications, the original compression units are decoded to pixel content and re-encoded using different compression units. The extraction procedure illustrated in FIG. 5 involves analyzing the original bitstream to determine the compression units that could possibly contain alterations (510). This analysis reproduces many of the same procedures used to determine the compression units that are suitable for modification during embedding such as random distribution of embedding location, obfuscation of the locations using a secret key and application of a perceptual model. The information can be recreated from the original or can be determined once and stored to be used for embedding and extraction.

Once the modified compression units have been identified from the original, the video to be analyzed for the presence of embedded information, also called copy (515), is compared to the original in order to ultimately determine if and in what way the compression units have been modified. The copy is compared to the unmodified and to the modified original and the closest comparison is assumed to be the version of the copy. In the simplest case, the presence of a modification indicates a binary 1 to be embedded at this location and the absence indicates a binary 0. Although in other embodiments, information can be embedded based upon the type of modification, with detecting none or one of N possible modifications, utilizing an N-ary embedding scheme.

In order to identify the relevant compression units in the copy, it is aligned (520) with the original. The alignment in time can be performed through a manual match of start and end frame and linear interpolation of intermediate frames, by using the PTS or other timing information in the video streams, the knowledge of the frame rate, by frame by frame comparison or a combination of these. The process can be applied in the beginning of the extraction process and re-applied whenever the movie is out of sync, e.g., through frame drops or motion introduced during recording. That process can be semi-automated in a procedure during which an operator indicates approximate matching locations of frames and corresponding pixels in the original and copy and the extraction comparison process increases the precision by comparing the environment of the pixel in the copy with that of the original and finds the best match. Appropriate comparison methods to determine the degree of degradation (530) such as correlation and their applications are well known to those skilled in the art. A comparison of selected components, which are more robust can be used to increase precision. These components depend on the type of degradation. Examples are low frequencies, gray levels and relative contrast ratios. The content of the original can then be transformed to appear more similar to the copy (or vice versa). In general, it is preferred that the original is converted to look like the copy in order to keep further degradations to the possibly already degraded copy to a minimum. Geometric distortions can be approximated by using matching points during the transformation. These image registration and transformation methods are again well known in the art and can compensate for shifts, rotation, scaling, bending and similar modifications. The precision of the transformations depends on the number of matching points. The amount of blur applied to the copy can be measured by the amount of high frequencies present in a frame of the copy in comparison the corresponding frame of the original.

In a number of embodiments, the degradation introduced by compression can be simulated by reading the compression parameters such as compression format, size, frame rate and bit rate from the compressed copy and applying those parameters to the original to make it more similar to the copy.

In a number of embodiments, the process to determine matching points and other degradations is re-executed in an iterative process (550).

Following matching, each possible embedding position is selected (560) and compared to the unmodified version and to all possible modified versions (570). The closest match is determining the most likely embedded information (580). This process is repeated for all possible embedding locations (590) and finally all pieces of information are aggregated (595), the data is decoded and the final payload is derived (597).

Although a specific process is illustrated in FIG. 5, other processes that involve comparison of an original bitstream and a copy to identify differences in the bitstreams associated with modifications to the original bitstream introduced to embed information can be utilized as appropriate for specific applications in accordance with embodiments of the invention.

Blind Extraction of Embedded Information

In many embodiments, embedded information can be recovered without reference to the original bitstream. Extraction is achieved by estimating the appearance of the original bitstream and the modified version from a copy. By way of example, information known to be embedded via frame dropping using replacement frames created by an average of the neighboring frames can be recovered by comparing each frame in the copy against an estimate of what it would look like if it were a replacement frame based upon its neighbors. Close matches are indicative of the presence of a replacement frame. The original (i.e., unmodified) bitstream can be estimated by predicting the content of the replaced frame by using 50% of the length for the motion vectors of image blocks that translate the frame prior to the replaced frame to the frame following the replaced frame. The estimation of the original bitstream can require a good estimation of motion vectors, and is best suited for scenes with global motion.

Approaches similar to the above example rely less on the original, instead utilizing a comparable test for each possible embedding location that enables recovery of the mark without the help of the original. The presence and absence or additionally the information encoded can also be estimated without the presence of the original content when observing dropped frames. Dropped frames can be observed by jumps in motion continuity in the case of deleted frames or by repeated elements indicative of replacement frames.

Extracting Repeatedly Embedded Information

In many embodiments, the information is embedded with a certain amount of redundancy applied by repetition and error correction methods. Modifications that introduce a stronger difference can be assumed to have better reliability during extraction and the information read from these modifications can be trusted more when assembling the final result. When combining information extracted from different portions of the bitstream the extracted bits can be weighted, such that information that is derived more reliably will contribute more to the final extracted information. Information that is extracted more reliably is typically identifiable as information extracted from compression units that exhibit strong differences during the comparison of the modified version and the original (i.e., unmodified) version. The difference of the unmodified to the modified version can be determined at embedding when both versions are compared to each other and similarity is measured. Therefore, reliability weightings can be determined during embedding and/or during extraction. Different measurements for similarity exit. One simple measurement is the sum of the absolute difference between pixels of a modified frame with pixels of corresponding locations of the unmodified frame. Similarity measures can be used during embedding to attempt to embed all payload data with equal strength (i.e., strength within a predetermined range), or to omit embedding at locations where the embedding is not strong enough and does not contribute to encoding robust data.

Extraction of Delta Additions

In a number of embodiments, the extraction of delta additions in modified compression units utilizes the fact that the embedded information is added to a repeated compression unit. Taking the difference or delta of the repeated compression unit and the repeated compression unit containing the delta additions provides the delta additions (i.e., embedded information) and suppresses the movie content within each of the repeated compression units. Referring to FIG. 2, during the extraction process the frame 235 is subtracted from the replacement frame 240 to derive the delta additions without the video content that is noise to the extractor. In watermark extraction, the underlying video signal is often a hurdle in decoding the embedded information. Therefore, removing the underlying video information facilitates the decoding of the pattern introduced by the delta additions. In particular, the repeated compression units both possess the same distortions relative to the original compression unit. Therefore, the suppression of the underlying content is independent of the distortions applied to the copy. By way of example, if content modified via delta additions has been camcorded, the frames of the camcorded copy will contain the same distortion of luminance and geometric variation. Therefore, the same distortions in luminance and geometric variation applied to the frames used to recover the delta additions, and the difference of the frames suppresses the underlying content despite the distortions in luminance and geometric variations. In circumstances where the frame rate of the copy differs from that of the modified bitstream, a reconstruction of individual frames may be required in order to suppress content and extract delta additions.

Efficient Embedding by Modification of Compression Units

Many watermarking applications require fast or lightweight embedding in the compressed domain. As is discussed further below, systems in accordance with embodiments of the invention utilize a variety of techniques to simplify the embedding process. In several embodiments, modifications are achieved by simply copying small amounts of pre-generated data to replace a compression unit within the encoded content.

In a number of embodiments of the invention, the need to apply complex modifications in the compressed domain is avoided by simply replacing entire compression units, eliminating the need to process the interdependencies within that compression unit. Furthermore, the approach uses highly efficient mechanisms inherent to compression encoding to replace the data representing the modified compression unit with a small efficient data block that references information from neighboring compression units to implement the modification. Therefore, modifications are possible with very small amounts of data overwritten in the compressed domain while maintaining content that is perceptually similar to the expected content. The process fills the gap that has been created perceptually by replacing the original compression unit with data that is close to that original data. There are however differences between the original and the replaced data. That difference can be identified after transformations and is the robust data carrier.

In many embodiments, the file is pre-processed in order to determine locations that are suitable to be modified and appropriate replacement data to implement the modifications. Pre-processing can be performed in a first location and the resulting possible bitstream modifications can be transmitted to a second location. The process is performed by a pre-processor that contains the processing logic implemented in hardware or as a software module. The transmission can occur using a separate data channel, stream or file, or it can be encoded in the compressed file as data that is not regularly used during decoding. The first location can be part of the encoding process or part of an encryption or transmission process.

The pre-processing can also add the replacement data to the compressed file so that a decode device can simply copy the replacement data as appropriate to modify compression units in accordance with embedded information. That data can be added as private data. Other data, that is less or not relevant can be removed in order to maintain the resulting total size of the file. To maintain the file size can be desirable for reasons like reducing the amount of changes in a file that is modified on a data carrier in place, limiting amount of required transmission, maintaining dependencies with other files, or fitting in a pre-determined container. Removing data can be done by removing redundant or irrelevant data, such as private data. It can also be performed by increasing the compression ratio of neighboring compression units. The removal and addition results in replacement, if identical locations are used. The identification of locations suited for embedding can be achieved with steganographic methods that are not robust but easy to embed and verify, such as the slight modification of PTS or other timestamps that have no significant impact on playback and can yet be used to encode information without increasing the size of the file.

Embedding Information by Modifying Compression Units

A number of system architectures can be used to efficiently embed information by modifying compression units in accordance with embodiments of the invention. In many embodiments, the unmarked bitstream is pre-processed to identify locations in which modifications can be made and the modifications that can be made in each location. When the bitstream is marked, a subset of the potential modifications identified during pre-processing can be selected to encode information in the content. In several embodiments, the bitstream is transmitted as broadcast while unmarked and later marked by a decoder prior to display. In a number of embodiments, content is unicast and marked prior to transmission and receipt by a decoder.

Embedding Device

The replacement data prepared in the pre-processing step is applied by an embedding device that contains logic for replacing data according to the information that is to be embedded. The logic can be integrated in hardware or can be executed by a software module. The embedding device may be embedded on the receiving client device or before transmission on the server side as outlined below.

Marking Content in a Decoder

Figure 6:
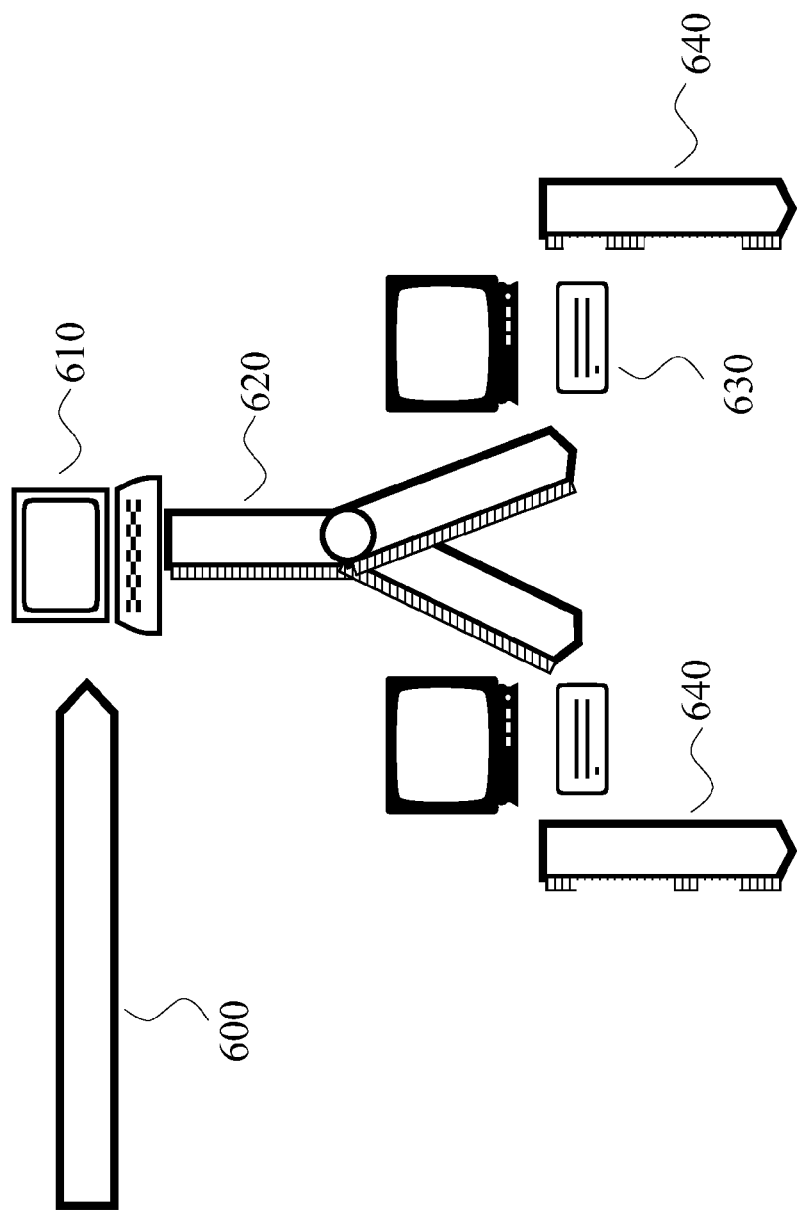
FIG. 6 conceptually illustrates a system for marking a broadcast bitstream in accordance with an embodiment of the invention.

A system for distributing encoded content and marking the bitstream to identify the device that decoded the bitstream (decoder) in accordance with an embodiment of the invention is illustrated in FIG. 6. The unmarked bitstream (600) is pre-processed by a pre-processor (610). During pre-processing replacement data is created and typically combined with the bitstream to form a content bitstream 620 including the original bitstream and replacement data. The bitstream is delivered to one or more decode devices 630. All of the decode devices receive the same stream in a broadcast manner and mark the content using the replacement data according to the unique information to be embedded. In several embodiments, the decoding device executes watermark embedding software that understands the format of the replacement data and applies it according to the payload information to be embedded. In many embodiments, information is embedded by applying replacement data or leaving the bitstream unmodified in each location in which information can be embedded. The marked media content is output (640) by the decoder for display. The decoder client device includes devices such as mobile phones, Set Top Boxes, game consoles, portable media device, display and projection devices and similar consumer electronics.

Embedding at Headend in Unicast Systems

If pre-processing is used, the embedding locations and the required overwrite information is selected. The actual embedding can consequently be reduced to the replacement in correspondence to the payload information. This application can even be further reduced to a copy operation of data, such as several bytes that is used in order to replace bitstream elements. The resulting application of the mark is simply executing copy operations for given data to a given position that is conditioned by the information to be embedded. The reduction of the actual embedding process to limited copy operations also enables server side marking approached during which the mark is applied on a media server such as a streaming server, VoD server, cable or satellite head end and can be unique per client, in a scenario where every client received an individual stream copy of the data (unicast) the server can determine the information to be embedded according to the application and modify the stream before sending it out. Very efficient implementation is required for this process since the server needs to apply this modification for all clients and serve several and possibly growing number of clients. However, in some embodiments that enable server side marking the bitstream is not marked during or just before transmission but several bitstream files with unique identifiers are stored in advance and a unique identifier is assigned to the receiving client during download, such that the unique identifier is assigned to the client at download and at this time becomes indicative of the client device.

Figure 7:
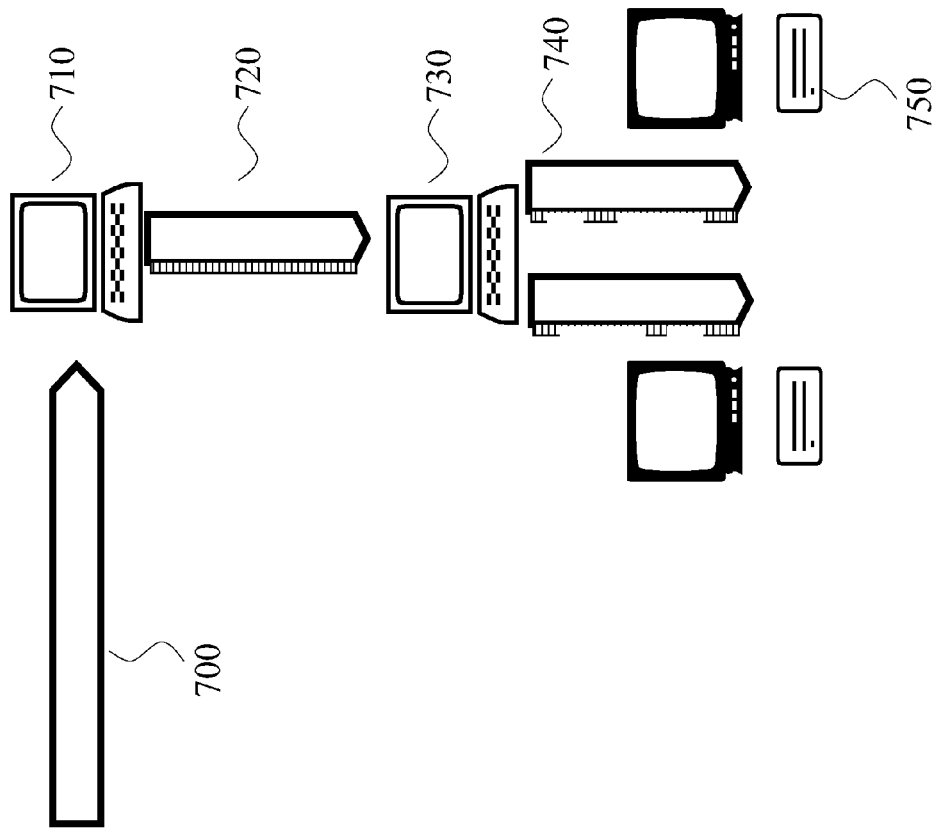
FIG. 7 conceptually illustrates a system configured to uniquely mark a unicast bitstream in accordance with an embodiment of the invention.

A system in which embedding is performed at the headend in accordance with an embodiment of the invention is illustrated in FIG. 7. The unmarked bitstream (700) is pre-processed by a pre-processor (710) but the result (720) is not directly delivered to the consumer electronics device, but to a video server (730) that builds a unicast connection with each receiving client. This streaming head end video server is configured to execute embedding software that applies the replacement data according to the receiving client. The server can modify the bitstream by application of the replacement data to embed information that identifies the receiving client and delivering a unique stream (740) to each client. Each client (750) is configured to decode and display the content in a similar way, without the need of executing watermark embedding operations, since the bitstream it receives is already individually marked.

Data Used to Represent Modifications

When modifying compression units in accordance with embodiments of the invention, data used to overwrite specific compression units can be static and pre-processed such that no processing is required for an individual compression unit. The pre-processed data can simply be copied over existing data and can instruct the decoder to perform static functions including but not limited to, duplication of the previous frame, averaging of neighboring frames, or duplication of the previous frame with a position shift. For example, an MPEG1, MPEG2 or MPEG4 compressed, skipped frame that copies information from a previous frame does not depend on the content of the frame it copies information from. So the data of a skipped frame can be pre calculated for the bitstream depending on the frame size and inserted at chosen locations to encode data. This concept can be extended to several pre calculated frames that are different and are selected depending on the information to be encoded. Each pre-calculated frame applies a different modification. If N different pre-calculated values are available, than a value between 0 and N can be embedded by choosing one of N or no replacement frame. For example, if 2 possible modification frames are available, one would copy the previous frame and another would copy the next frame then, depending on the information to be embedded, a 0 can be embedded by not applying a modification, a 1 by using a copy of the previous frame and a 2 by using a copy of the next frame.

In several embodiments, modifications are achieved by overwriting data representing compression units with pre-processed data and any data that is not overwritten from the compression units is marked as private data. Private date is typically ignored during decoding. In this way, modifications can be performed efficiently and without altering the file size. In many embodiments, data generated during pre-processing can be stored in a file as private data for later use. In this way, data that can be efficiently used to modify a file using copying operations that are small enough to be included in the file.

Modifications Utilizing Private Data

Figure 8:
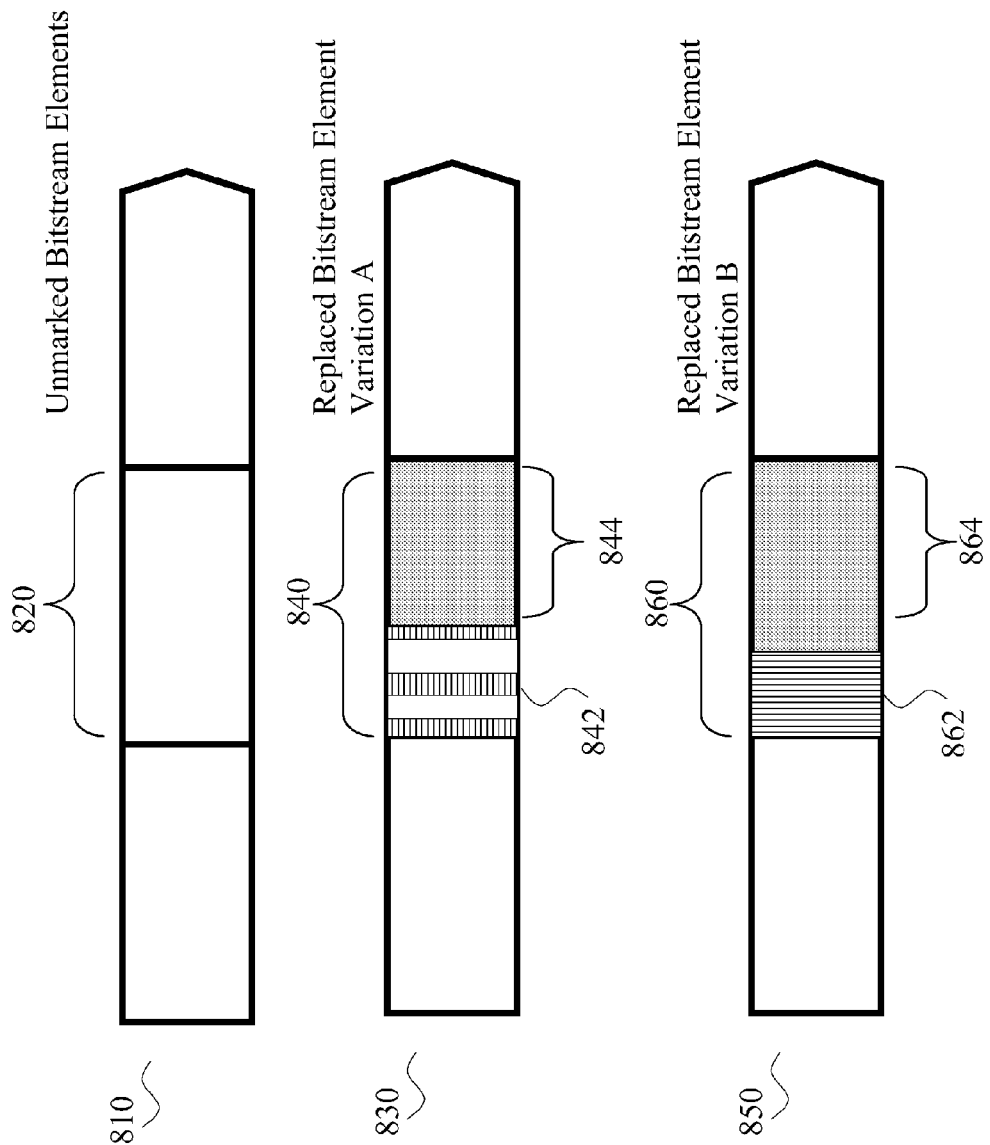
FIG. 8 conceptually illustrates various modifications of compression units that can be performed to mark an encoded bitstream in accordance with an embodiment of the invention.

Referring to FIG. 8, 3 compression units of an unmarked bitstream (810) are shown. One of the units (820) has been determined to be suitable for modification. Depending on the coding scheme and information to be embedded, the alteration might occur in one of several variations or not at all. In variation A, (830) the unit 820 is modified (840) by replacing only part of the unit with information of the same size or smaller (842) and the rest is marked as private data (844) in order to ensure that it will be ignored during decode. Private data is information in the bitstream that is to be ignored by a regular decoder and provides information only to some specific applications. Private data is also called user data or comments. In many instances the effect of private data can be simulated by marking data as compression units that are ignored and not used during playback such as a different stream in a file that contains several streams e.g., MPEG-2 transport stream or hinting in an MPEG-4 part14 container. Another variation 850 is shown. It replaces the entire unit with different information (862) and also marks the remaining information (864) as private data. In a number of embodiments, the data that is marked as private data can be overwritten with junk data to prevent reconstruction of the content from multiple copies that are marked in different ways. Rendering unused information unrecoverable is discussed further below.

Figure 9:
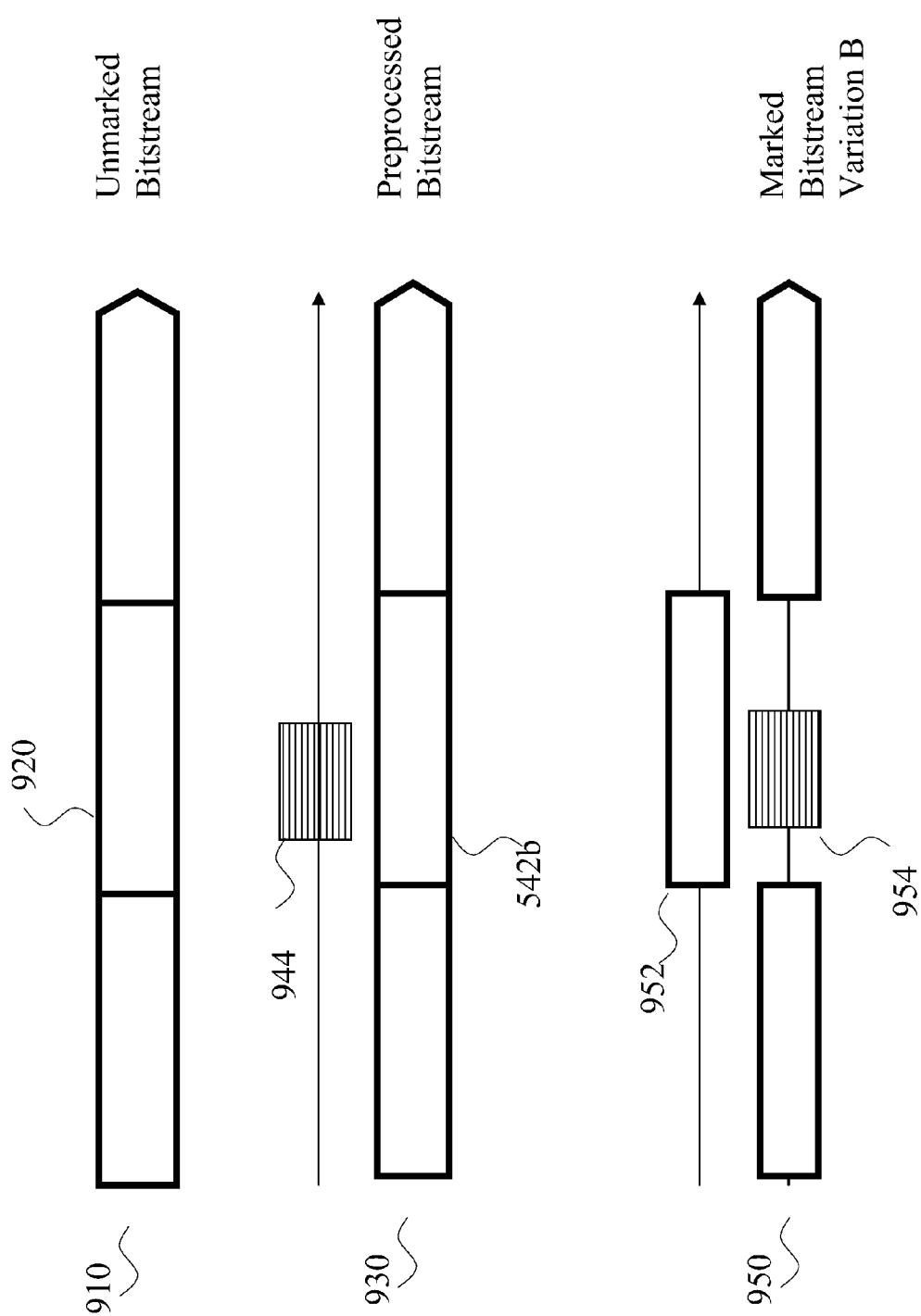
FIG. 9 conceptually illustrates addition of pre-processed data as private data to a bitstream in accordance with an embodiment of the invention.

Referring to FIG. 9, the unmarked bitstream (910) is pre-processed and data is added to the bitstream that can be used in lieu of data encoding original content 920. This data (944) can be used as replacement data to encode information as described previously, but it is stored in the bitstream such that the elements to be replaced are not overwritten but, if used, the alternative replacement information is marked as relevant while the previous information is hidden as private data. The information (944) is not used when played with a regular decoder but embedded in the file such that it is hidden and ignored during playback. It can be marked as a different program or elementary stream in a transport or program stream or it is marked as private data. When an embedding procedure is applied to the content and according to the coding scheme and payload the modification is to be applied, the information 942 is marked to be ignored during playback and the information 944 is to be used. This is represented by the marked bitstream (950) that is modified such that the decoder will be using data 954 that encodes the marking and ignoring private data 952.

The inclusion of helper data in the bitstream is important in cases where no additional means of transporting and delivering the replacement data exists, e.g., content transport and distribution systems that are already designed and used and do not allow for modification and additions. In some of these instances it is also important that the file size does not change due to system dependencies. In this case the replacement data can be embedded in the stream by compressing some elements stronger and using the space that is thereby made available to store the replacement data as private data.

Rendering Unused Information Unrecoverable

Secret or asymmetric keys may be used to encrypt the embedded information or derive hash codes from information that are embedded for verification and comparison purposes.

When original information is overwritten with significantly smaller information, it is often desirable to ensure that the information that is not overwritten is rendered unusable and can not be used to restore the original content. This can be achieved by overwriting that information. Overwriting parts only will be more efficient and introduces a sufficiently strong degradation, in particular when applied to the bitstream of video encoded with an efficient compression scheme that reuses the information and propagates an error. Modification to the bitstream to destroy the information in the bitstream is in particular easy when it is encrypted. As blocks of data are interdependent during decryption, modification of a small piece of information typically results in strong distortion of the data, often resembling pseudo random information after decryption. The size of interdependent blocks depends on the compression scheme and for stream ciphers may include entire files or compression units.

The concept of replacing information can also be applied to a bitstream that is encrypted. To do so, the possible modification locations remain unencrypted and can be replaced with clear bits. This is effective as the replacement data is typically so small that it only replaces the beginning of another compression unit, which can remain unencrypted without revealing much information of the frame. Alternatively the replacement data can also be encrypted before it is used for replacement.

Representations of Modifications in Separate Data Files

Regarding the implementation options of FIGS. 8 and 9, the embedding of the information in the bitstream in FIG. 9 reduces the required effort during embedding to toggling elements from private data to relevant data to enable a replacement element to be used while the extra data in FIG. 8 does not change the size of the marked file. In either variation, the location of areas that can be modified can be stored in a separate file that includes instructions to exchange data depending on the information to be embedded. Using this file further reduces the embedding effort of parsing the media to be marked to a simple executing of data copy operations.

In order to keep the amount of data to be modified independent of the distribution of information that is embedded and to evenly distribute the modifications, the pre-processing can create a file that has part of the modifications required to apply a change in it. This is applied in cases where the presence of a change signals an encoded binary value and the absence signals the different binary value. To explain this approach an example is used where a compression unit is modified that consists of two data blocks. In the following description, the compression units are separated by comma and the data blocks are represented by letters. The original bitstream in this example consists of the blocks AB,EF,HI, XY. The compression unit EF is used to store a binary 1 if modified, a binary 0 otherwise. If the unit EF is modified it is changed into ST. The pre-processing now stores the compression units as AB,SF,HI,XY. The resulting pre-processed file might not be playable, an effect that might be desirable since now, the watermarking has to be applied in order to make the bitstream useable. After this, there is a modification required for embedding a binary 1 as well as for embedding a binary 0, but the amount of required modification is distributed between the 2 cases. To embed a 1 the pre-processed file is changed from as AB,SF,HI,XY to as AB,ST,HI,XY otherwise it is changed from as AB,SF,HI,XY to as AB,EF,HI,XY, resulting in the original, unmodified file.

Additional Techniques for Hiding Data in a Bitstream

In embodiments that use replacement data that is pre-processed and encoded in the stream, that replacement data can be hidden in order to not be readily usable by an attacker as an indicator for embedding locations. To hide the replacement data, it can be marked as user data or placed in a different element within the bitstream that will be ignored during decode of the stream and is not apparent such as a frame that is not used or a different track such as an audio track that is not used.

The idea can be extended to always store 2 versions of a frame in the bitstream; randomly some are activated at the recipient side. It is not clear for the recipient which is the intended frame and which one is the correct one. This is not apparent from the size and configuration. Trick frames that are never intended to be used can be inserted at individual positions, should an attacker remove those elements he will actually reveal the embedded information.

Applying Modifications without Pre-Processing

Pre-processing can be useful for applications, where benefits are obtained by processing in advance and limiting processing during embedding. In some applications, a bitstream is marked without the benefit of pre-processing. These are, for example, environments that do not allow for integration of a pre-processing step or where the bitstream is delivered in real time. In particular the pre-processing can not analyze the entire bitstream in order to select the best embedding positions that provide the best trade off between imperceptibility and robustness, by judging the suitability in comparison to all other positions. In these scenarios, it is a challenge to determine the best locations of bits to be embedded in the bitstream. Part of the solution is to space the modification out evenly, e.g., dropping every Nth frame except where frames cannot be used because the bitstream makes the modification too difficult (e.g., the frame is not independent), or the modification would be too visible. This process can later be reproduced on the original stream in order to identify the processing locations that have been chosen to embed the bits. This system described above however can present complications where the stream does not have a known start position and different playback devices start playing the stream at different times embedding the first bit in different locations. If this location is not known the start point of the repetitive payload bit sequence can not be determined. A pseudo random distribution can be used to solve this problem.

Pseudo-Random Selection of Suitable Compression Units

Figure 4:
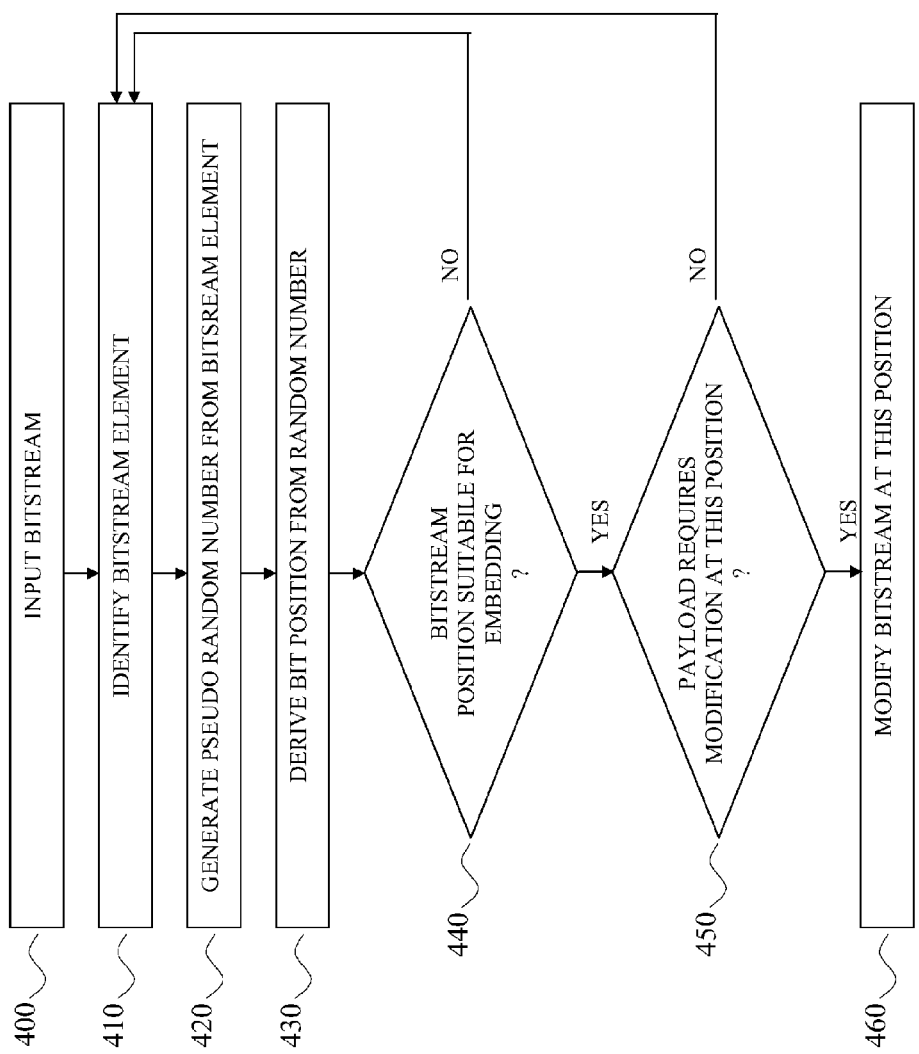
FIG. 4 is a flow diagram illustrating a process for pseudo-randomly selecting compression units for modification in accordance with an embodiment of the invention.

A process for pseudo-randomly selecting compression units for modification in accordance with an embodiment of the invention is shown in FIG. 4. In the illustrated process, an input bitstream 400, originating from a file or transmission as a stream, is analyzed to identify compression units that can be imperceptibly modified and a bitstream element 410, which is used to derive a pseudo-random number 420. That pseudo-random number is used (430) to select which of the compression units that can be imperceptibly modified is modified to embed the current bit within the bitstream. It may not be suitable if modifications will be perceptible or cannot be independently modified. If it is suitable then it is modified (460) if the payload requires modification (450), e.g., if a binary 1 is to be embedded and the binary 1 is expressed with the presence of a modification. This process ensures that the embedding can distribute the modifications in a way that can be reproduced during later extraction even if the embedder pre-processing can not process the entire video nor defined section but is given arbitrary content sections at arbitrary locations.

Random distribution is also useful in cases where the content may allow more robust embedding in some places. The random variation will likely prevent several bits being embedded in a weak content sequence that does not allow robust embedding, which is undesirable if the deployed error correction code is tuned to recover random errors better than burst errors. Furthermore, the security of the embedded information is increased as the bit locations can only be determined with the presence of the original content.

Embedding a Synchronization Code

One solution for identifying the start position of a stream is the use of one or more synchronization codes as part of the payload that contains a bit sequence that is unique in the payload and therefore marks the beginning of the sequence. Different watermark systems may be used to apply the synchronization code, including the approach described here. The synchronization locations can be embedded in advance or also be translated into replacement data. Another preferred solution is to derive the positions from elements in the original bitstream, resulting in an embedding of the same bits in the same location consistently and being able to reproduce that position with the help of the original file during extraction. An example on how to determine the position from the bitstream follows. A compression unit that varies continually is selected, for example a timestamp like the PTS (presentation time stamp) value. The value is hashed in order to derive a pseudo random number that is in a range exceeding the number of bits in the payload. The modulo of that number and the length of the payload results in the bit to be chosen for embedding. This ensures an even and reproducible distribution of payload bits without using additional information for a synchronization code.

Embedding in Encrypted Content

Unless the bitstream is marked on the server, before it is delivered there may be a time when the bitstream, or parts of it, are received by the client device and have not yet been marked. An attacker might try to copy the data before the mark is applied in order to get an unmarked copy of the content. This may be prevented if the content remains encrypted while it is marked, as the encrypted content is not playable without errors and therefore an attacker will typically try to copy the bitstream after decryption. The mark can be embedded in the encrypted bitstream, if the replacement data is encrypted in the same fashion as the bitstream, using the same key and encryption mechanism. For encryption algorithms that modify the result depending on previously encrypted data (stream ciphers), the bitstream is encrypted in two variants, once with and once without the replacement data, in order to generate replacement data that fits with preceding stream data. The bitstream that is transmitted is the version that is encrypted without the replacement data, this will prevent the remaining information from being decrypted and the stream should reset at the start of the next compression unit that is to be used. For systems that mark bitstream by replacing entire frames in accordance with embodiments of the invention, frames can be encrypted individually, the remaining data of the compression unit that has been marked as private data, e.g., 844 in FIG. 8 can not be decrypted any more; a desired side effect of this approach since it can not be used to restore the original frame. Alternatively, the locations that are a target for replacement data may remain unencrypted. Since they are typically small they will typically not affect the obfuscation achieved by encryption significantly.

Extensions of Marking by Modifying Compression Units

Compression units that are dropped, overwritten or modified as described in the embodiments above, do not have to be video frames. The same concepts, such as marking sections of the bitstream as user data, dropping elements, overwriting and modifying compression units also applies to other compression units in accordance with embodiments to the invention such as entire GOPs, field, sub-frames (so called slices in H.264), macroblocks, encoded frequencies in MPG3, audio frames in MPEG3, MPEG2 layer 3. Depending on the entropy encoding and compression format, these compression units can be exchanged in their entirety without affecting subsequent elements.

Using Syntax Elements to Embed Information

Information can be added to encoded bitstreams by overwriting syntax elements that are redundant to code varying information. An example for this approach is the Picture Parameter Set (PPS) in the H.264 compression standard, regularly it is used for several encoded frame elements called slices that refer to one PPS if they have all parameters in common that are stored in the PPS. In some compressed files the PPS is stored for single frames or small groups of frames, resulting in redundancy through frequent repetition of the PPS information. In this case the PPS can be replaced or removed. One way of replacing it is by changing the PPS information, creating a different PPS that can be referred to from modified data in order to use different parameters for the slices that are replaced.

Application by Modification of Time Synchronization Data

For time sensitive media, such as video, it is important that the playback speed is maintained. One of the reasons is audio video synchronization (abbreviated AV sync), which ensures the visible events are audible simultaneously. Video compression formats such as MPEG2, MPEG4 (including H.264), and VC1, contain information that indicate when audio and video are played back in order to be synchronized. This information is easily accessible in the compressed bitstream and has a significant impact on the decoded content, as it can be used to force a frame drop during playback.

The following elements are part of the MPEG2 specifications and are also used for MPEG4 streams. They are part of either the MPEG packetized elementary stream, program stream or transport stream. Similar elements are used for other compression standards.

PTS: The Presentation Time Stamp is used to establish the time at which a unit such as an audio portion or video frame are displayed. Audio and video tracks in PES format contain PTS values that are based on a common reference clock. The modification of the PTS can force a deletion or duplication of a frame, when one or more PTS values are increased or decreased by an amount that is at least the interval of one frame to be displayed. These modifications are than registered to encode information. The PTS modification can be applied to either audio or video in order to change the AV sync in order to encode information.

DTS: The Decoding Time Stamp is the indicator for the decoder for the time to start decoding the unit. It is used when the decoding order is different from the presentation order in a case where media portions borrow information from future media portions. In mpeg2, DTS values are used when B frames copy information from future P or I frames and require their information in order to be decoded. In this case the I or P frame that is displayed later needs to be decoded before the B frame that is displayed earlier. The DTS modification is used to change a frame order and to swap 2 frames such that for example, the a frame sequence of frames A,B,C,D results in a frame sequence of A,C,B,D. If the frames C and B are similar, the modification is barely visible yet the resulting modification to the content is such that it can be used to encode robust information.

ESCR/SCR/PCR: Reference time stamps are the indication of the current time. Reference time stamps are found in the PES syntax as ESCR (Elementary Stream Clock Reference), in the program syntax as SCR (System Clock Reference), and in the transport packet adaption Program Clock Reference (PCR) field. Clock reference data is setting a relative clock that is synchronized between the encoder and decoder to ensure they both have the same playback speed of the total video as well as AV sync. In one embodiment, the modification of PCR values is used to change the speed of playback for certain intervals. The playback speed is a strong and imperceptible content modification that can be used to encode data.

VBV delay: The Video Buffer Verifier delay indicates the length for which a compression unit to be decoded is supposed to reside in the video buffer before decoding. In one implementation, its value is changed in order to induce a frame drop or duplication or change the playback speed.

Frame or sequence number: The frame number of a compressed frame indicates its position in the stream. In one embodiment, the swapping of frame numbers results in the swapping of frames during content display. If the frames to be swapped are carefully selected, this results in an imperceptible yet the resulting modification to the content is such that it can be used to encode robust information.

Frame rate: The frame rate measured in frames per seconds (fps) sets the speed of how many frames are displayed per second. Common frame rates include 30, 29.97, 25, 24 and 23,97. A change from one frame rate to another within the video is used for a limited amount of time in one embodiment in order to induce a frame drop or duplication or to change the playback speed, or to create an AV misalignment. These modifications can be applied in an imperceptible manner and used to encode information.

Other timing information that can be modified to vary timing information include the SMPTE time code and the 'slow motion' and 'freeze frame' flags in the mpeg PES header, the indicator of what field to display first and the pull down information that lists how a frame rate conversion is performed by indicating which fields are duplicated. Other compression information that can be used to induce a frame drop is error detection code, CRC or checksum that verifies the integrity of compression units. If they are altered, the data is assumed to be invalid and skipped.

The above values such as DTS, PTS, VBV delay and PCR/SCR require common, synchronized modification to ensure an effect during decode, since they are in part encoding redundant information and it is not predicable what information a given decoder will use.

Many of the above embodiments implement a variation in the time domain of time based media also called jitter. Jitter is an effect that is often occurring as the result of a processing error or imprecision; it is therefore not directly perceptible as an intended manipulation, making it secure and less visible. In previous watermarking approaches jitter is seen as an obstacle for reading watermark information in. Here it is used to encode information.

The modification of the values above can also be used for small modifications that are not necessarily reflected when the content is played back, but it is still maintained when the bitstream is transcoded. The resulting effect is encoded information that has no or rare effects on the displayed content yet it remains in the content when it is transcoded from one compression or video format to another. One example of such a modification is the change of a PTS value by a small value of less then the timing between two frames, e.g., +−1. The actual difference in time less than a millisecond and that is rarely relevant for display, yet the presence of even or odd numbers can be used to encode binary digits and higher manipulations can encode higher order numbers.

Figure 10:
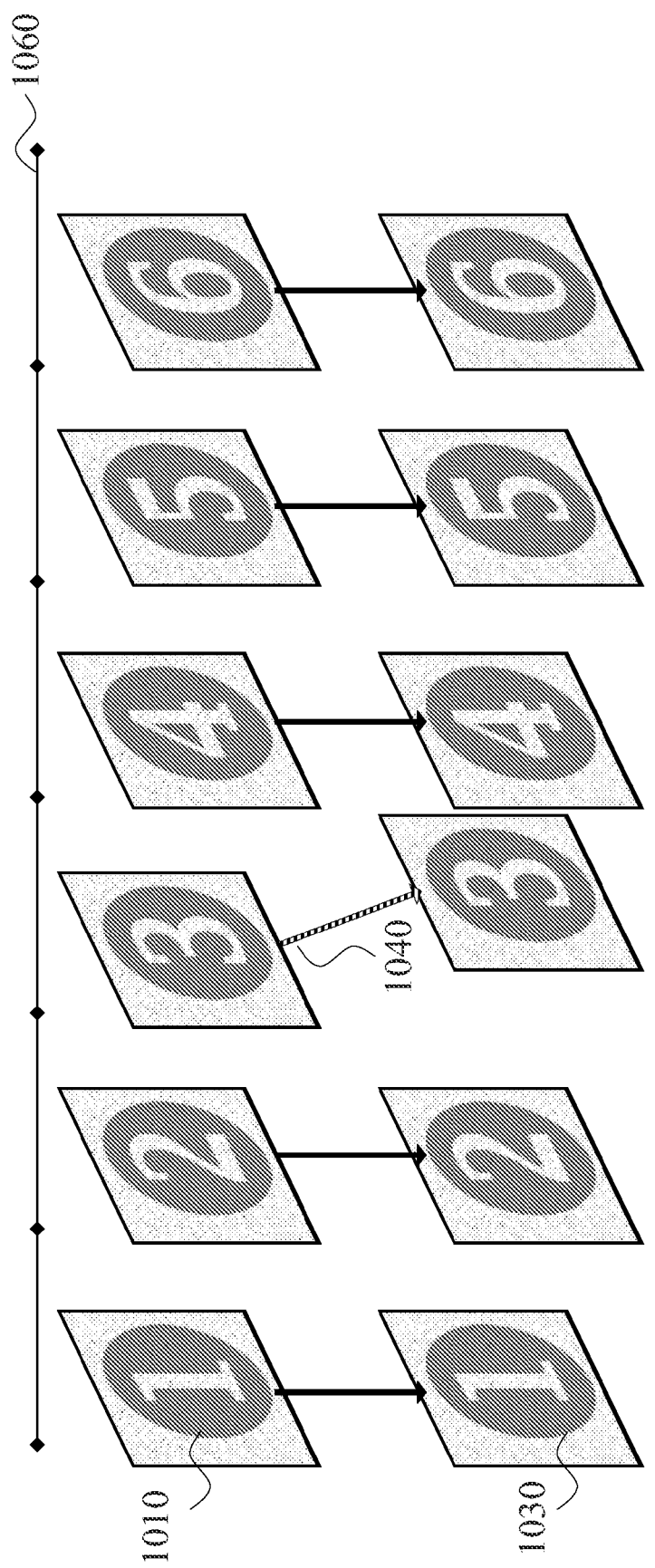
FIG. 10 conceptually illustrates marking an encoded bitstream by modification of synchronization information in accordance with an embodiment of the invention.
Figure 11:
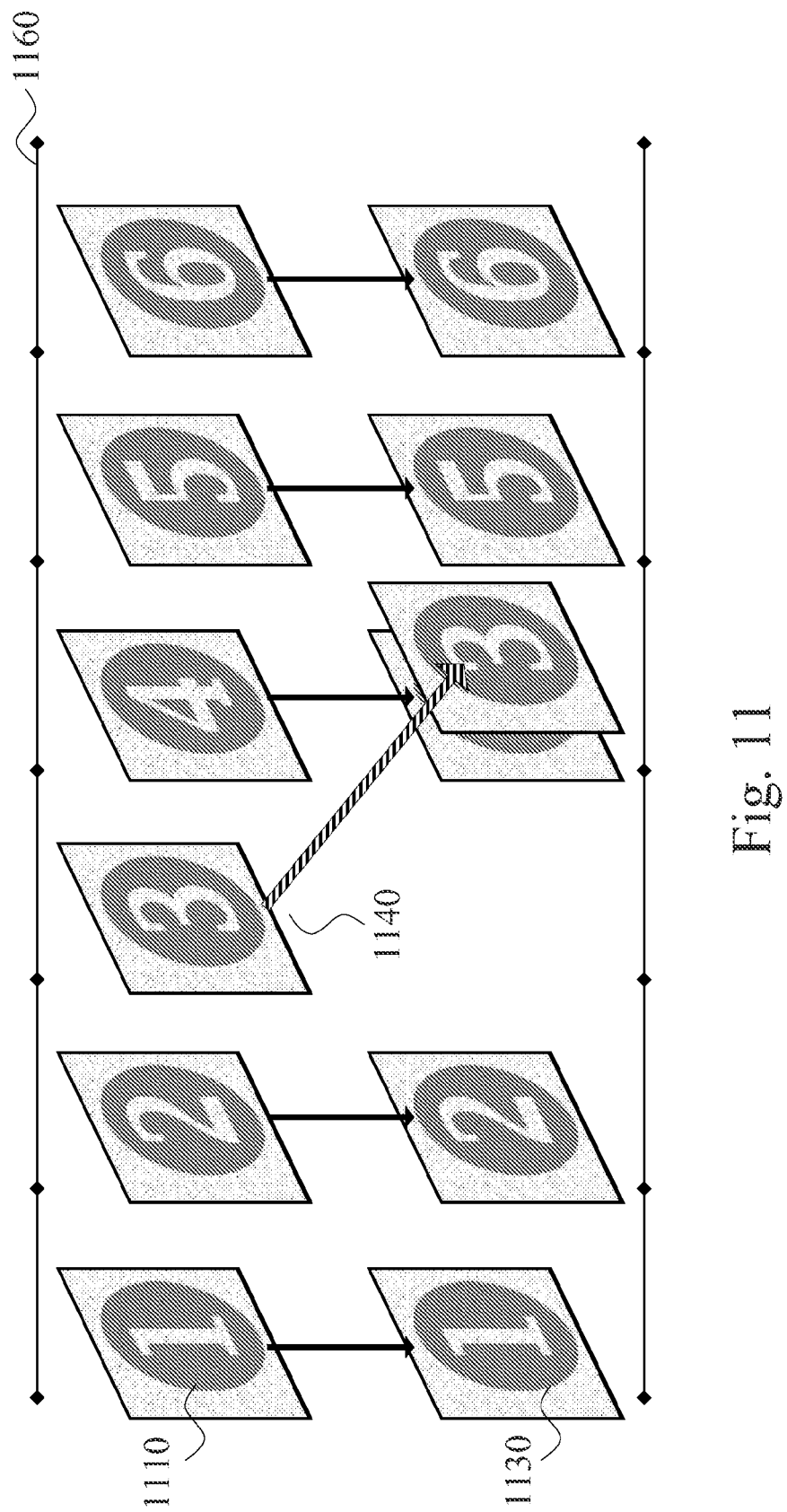
FIG. 11 conceptually illustrates a self-enforcing marking in accordance with an embodiment of the invention.

A small modification of the synchronization information is represented in FIG. 10 where the frames (1010) are spaced out evenly on the timeline 1060. With the modification (1040) of the timing information the frame number 3 is repositioned in time to create a modified video stream (1030). FIG. 11 contains a larger modification with witch one frame (1140) in the original bitstream 1160 effectively replaces frame '4' by being placed in its direct temporal location. FIG. 11 is discussed further below.

Synchronization Modifications

Modification of synchronization data can be applied very efficiently and is applicable to different formats. However the modifications might be ignored in some instances as the synchronization information is frequently redundant because different values encode the same or similar information and it can be predicted from global values like the frame rate. The following approaches are designed to make the synchronization information relevant, encouraging their use and therefore maintaining the data embedded therein.

If the frame rate is changed in the content and the synchronization information is required to maintain the correct original frame rate, then ignoring the synchronization information leads to distortions in the time domain. A similar effect can be achieved with a different approach that removes actual media content that is not relevant. One example of such content is a section of silent audio. If they are removed and the audio is played continuously without observing the timing information, the audio and video will get out of sync and the content quality will be significantly degraded.

While the modifications above are described in the context of encouraging the use of a playback or transcoding system that uses and maintains synchronization information, it can also be used to make every stream unique with a few manipulations, discouraging averaging of media in order to weaken watermarks contained in the media. Such an attack that aims to average e.g., several videos into one by selecting frames from different input streams or averaging on a pixel basis requires the precise time position of the streams in order to avoid significant quality degradation. A distortion of the time domain can make this averaging procedure with acceptable resulting video quality very difficult. The distortion of the time domain can also occur when changing synchronization values by random amounts, by varying the frame rate in short intervals or by deleting frames.

Self Enforcing Marks

In several embodiments, self enforcing marks are used. They are implemented by modifications that are less apparent during playback than during transcoding. An example for a self enforcing mark is a PTS modification that is placing a frame in a video just before its preceding frame or just after the following frame. An example is given in FIG. 11 in which the original video sequence (1110) is modified by changing the timing information 1140 of frame 3 to appear behind the following frame 4 in order to create a modified video sequence (1130). During playback, only one of the frames is displayed, resulting in a small visible impact. If the frames are decoded in order during transcoding that has no real-time constraints, both frames are used in a swapped order, resulting in a strong modification that is not only more visible but more importantly easier to detect as watermarking information.

Watermarking by Observed Error Propagation

Figure 12:
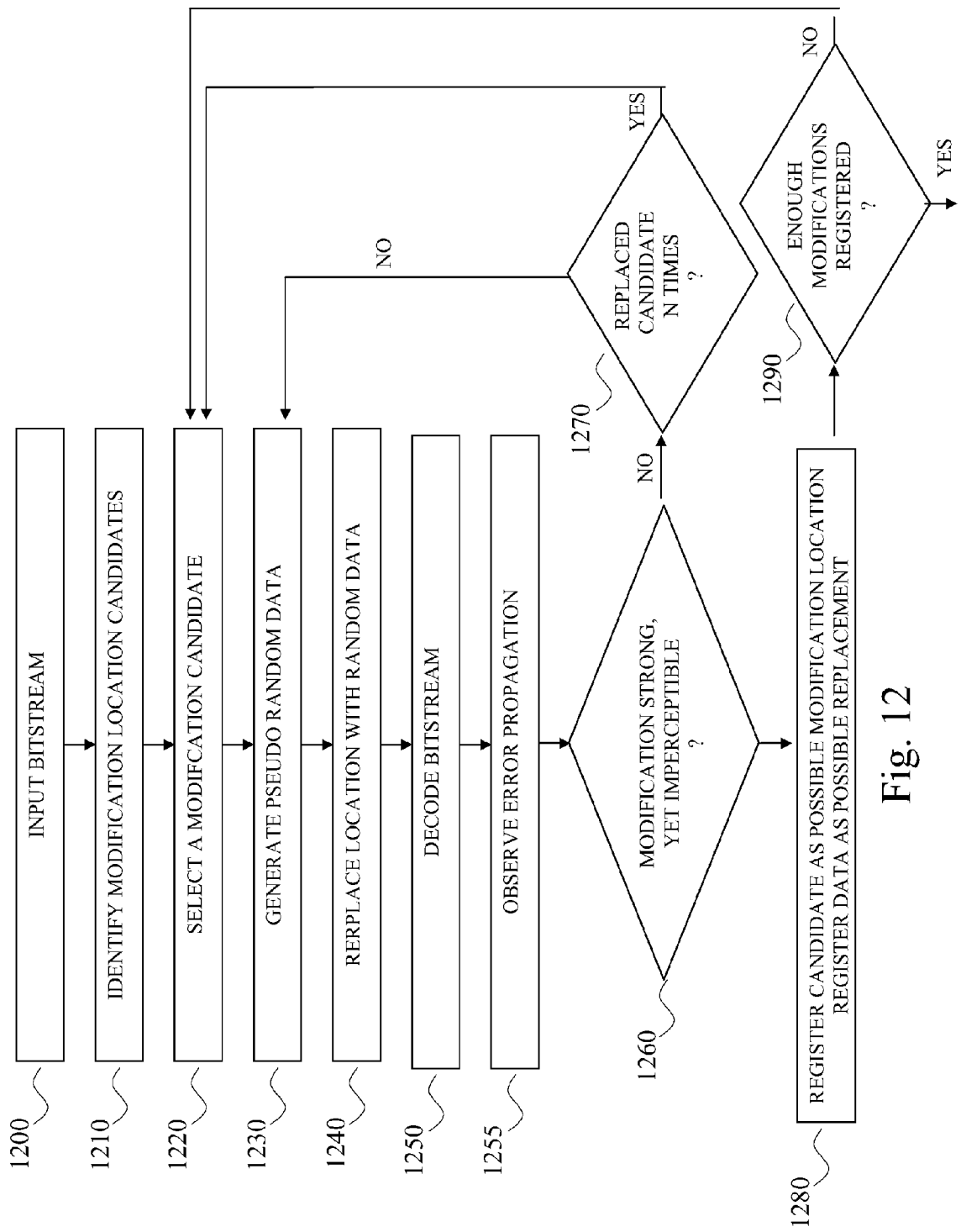
FIG. 12 is a flow diagram illustrating a process for watermarking by observed error propagation in accordance with an embodiment of the invention.

The concept of replacing compression units can be seen in a generalized way as watermarking by observed error propagation. The concept here is to introduce random errors in the compressed bitstream, decode the bitstream and observe if the errors that have been introduced are slight as to largely remain imperceptible yet significant enough to survive degradation. A process is illustrated in FIG. 12 where the input bitstream 1200 is processed to identify modification location candidates (1210) as elements that are a likely to resolve in a usable error when modified. The pre-selection will accelerate this pre-processing step. One modification candidate is chosen (1220), a pseudo random number is generated (1230) and used to replace the embedding location (1240). The modified bitstream is decoded (1250) and the embedded modifications or errors are observed. This is done by comparing the content to the unmodified original, measuring the difference. The selection process can be enhanced if coupled with a perceptual model that decides if manipulations are too visible. It is not the only intend to make the modification imperceptible; on the other hand they have to be strong enough to be robust and later readable. If the introduced error does not satisfy both requirements (1260), than the process continues through N versions of random data (1270). If no reasonable modification can be found after several attempts, the next embedded location is chosen (1270). If a possible modification can be found, it is registered as a way of embedding imperceptible information in this bitstream and the process is repeated until sufficient location have been found to embed the desired amount of information or all possible embedding locations are exhausted. The above process can be modified to include the possibility to embed different data in the same embedding location.

Robustness Considerations

Robustness for a watermark is the ability to remain readable after distortions to the content. Frequent distortions compression artifacts that result inserted or deleted frames, blurring and blockiness. The extraction is enhanced if the modified compression units can be unambiguously identified and recognized after distortions. For frame comparison several image comparison methods exist in prior art, such as different, sum of absolute differences and mean square error of pixel difference. In the preferred embodiment image correlation is used since it is robust against variations in global luminance. To increase robustness, compression units can be used that are maximally different from neighboring elements used for replacement such that variations will be identifiable. The same measurement later applied during extraction is useful to estimate robustness during embedding. Note that the robustness will typically conflict with the imperceptibility of the modifications, which that limits the amount of visible modification. Therefore, a trade off is typically found.

Security and Robustness Considerations

The approach of erasing some compression units during embedding and to determining the presence or absence of these elements during extraction with the help of the original is a relatively secure approach. The following section will describe critical attacks that are used to remove information of common watermarking systems and describe how the present invention is overcoming those.

Obfuscation of the Embedding Domain

The embedding of additional strong watermark data that resembles the initial watermark data will, for many existing watermark technologies, result in a predominant signal that is masking the original watermark message. For the present invention the purposeful, brute force removal of many compression units with the intent to degrade the mark will result in a significant degradation of the content, not however in an over proportional degradation of the mark, since only very few of the purposeful removed elements will be used for actually encoding data. For example if skipped frames are used to encode the information, than skipping 50% of all frames would result in a degrading of the content to 50% of its quality and yet only remove 50% of the watermark information, which would still allow recovery of the entire information if sufficient redundancy is used during embedding.

Targeted Removal of Modified Elements as Attempted Inversion of the Embedding Procedure In an attempt to remove a mark, an attacker might also understand what embedding elements are used and how they are used in order to understand where modifications have taken place. She would then remove those locations with the intent to destroy the mark. There are two obstacles for that attacker: first, she cannot replace the embedding locations with the original data, since she does not have access to the unmarked data (otherwise there would be no need trying to remove the mark). So, whatever replacement data is used to obfuscate the embedding locations, it would still be observable that certain locations are missing, indicating the previous presence of marking information. Second, in several embodiments, the marking is implicit in that locations that are not modified signal the presence of information because no modification has been taken place. These marking locations can not possibly be identified by an attacker since they have not changed. With alternating embedding locations where the same information is expressed by applying modification first and later by not applying modifications, all information can be represented without revealing embedding locations.

Restoration Using Remaining Private Data

In many embodiments, part of the original bitstream is overwritten, thereby deleting original data that cannot be restored. However, another part of the original information is marked as helper data e.g., 844 in FIG. 8. This data can be helpful to be used to restore the original bitstream in part when used by an attacker. This can be prevented by using the replacement data to destroy or obfuscate that data or overwriting it in the client device.

Geometric Attacks

Geometric attacks vary the media by operations like rotation, bending, shearing or stretching in time. In many embodiments of the present invention, the original is used to recover the embedded mark and a comparison of the original with the media to be analyzed can be used to determine and restore the geometric distortions. This may be performed in a semi automated manner.

Prevention of Embedding

An attacker might try to prevent embedding by removing or destroying the replacement data or to block the procedure that performs the embedding of the mark. Several approaches can discourage those attempts. First, it is reasonable that the replacement data is protected and obfuscated. Methods have been described on how to deliver the data, they can be combined and obfuscated to make erasing more difficult and the data can be encrypted together with the stream as common in current DRM and CAS applications. Second, the replacement data may not only be used, to embed a mark but also to deliver actual video data without which the content does not play back or contains errors. This will force the replacement data to be applied in order to accomplish error free playback.

Another variation of embedding information that ensures that the embedding is applied is to apply some of the modifications after the pre-processing stage typically performed by the media server. Only part of the modification is applied, leaving the modified bitstream with errors that prevent a decoder to decode this bitstream without perceptible errors. When the decoder is applying the modifications in accordance with the coding scheme and payload, the decoder will either invert the applied change using the original bitstream data that is transmitted as helper data or apply the remainder of the modification to create a modified location that can be decoded without perceptible modification. The resulting file is the same as if the decoder only applied the modifications however; some of embedding has to be performed to result in content that does not contain perceptible errors. An additional advantage of this scheme is that the copy modifications are more frequent but smaller, since only part of the modification data is applied. This results in a more even processing performance, desirable for media processing.

The pre-processing faces a lesser risk of being the target of an attack since it is performed on the site of the content owner, which can provide a better security environment and has a motivation for the mark to be embedded.

Applications

The systems and techniques described above can be used in a virtually limitless range of applications. The following are provided as a series of examples of applications in which systems and processes in accordance with embodiments of the invention can be useful.

Tracking Unauthorized Distribution of Secret or Copyrighted Information

A problem that faces many industries is the unauthorized distribution of information. Systems and processes in accordance with embodiments of the present invention can be used to embed marks in media information at the time of reception or display of the media. Each distributed copy can be uniquely marked with information such as a recipient identification number and a time stamp and, if the copy is publicly available or in the possession of an entity or individual that is not authorized to possess the information, the information can be uncovered and the entity or person that is the recipient of the media and the likely source of the unauthorized distribution can be identified.

In many instances, the secret or copyrighted information is passed between several different entities and/or individuals during production and authorized distribution. In several embodiments, the point from which the information was distributed without authorization can be ascertained by embedding a mark associated with the last recipient of the information prior to delivery or display. The entity or individual that is responsible for the unauthorized distribution can then be identified based upon the last mark added to the media.

A common instance, in which copyrighted information is communicated, is the distribution of copyrighted media via a network to a media player. In many embodiments, the player is a consumer electronics device such as a set top box or a personal computer. The copyrighted media is typically distributed to the player in a compressed and encrypted form. A mark can be embedded in the media in accordance with embodiments of the invention. The mark can contain information relating to the owner of the player and information identifying the time of transmission or playback. If the recipient of the information is known, the information to be embedded can be generated by the server (or head end) providing the media. The embedded information can also be stored by the server in a database that contains additional information about the transaction, such as the user's billing information and details about the receiving device. In other embodiments, the player maintains information such as player identification number and time, which is embedded as a mark during storage and/or playback.

Another instance in which unauthorized distribution is a common problem is in the production of media. During production, content is particularly vulnerable to unauthorized distribution that can cause considerable damage to the producer of the media. In many embodiments, marks are embedded in the media during various stages of production that identify the recipient of the media and the time of the receipt of the media. If the copy is made publicly available, the mark can be uncovered and the responsible person or entity can be identified.

In many of the embodiments outlined above, a perceptual model is created for the distributed media and stored or distributed with the media. The perceptual model can then be used as marks are embedded in the media. In other embodiments, a perceptual model is created every time a mark is embedded in the media.

Proof of Ownership

Once media is subject to public distribution, proving ownership of copyright in the media can be problematic. In many embodiments, marks are embedded in the media to prove ownership of the content. In a number of embodiments, the mark includes ownership information or identification for copyrighted content. This mark can be automatically read and its presence or absence can be evaluated to restrict or allow distribution or to verify that a source distributing the media is a legitimate distributor of the media. It can also be used, so that entities or individuals interested in obtaining rights with respect to the content can identify the owner of the content by uncovering the embedded mark. Another use for a mark identifying the owner is to automatically identify content in a publicly available database, e.g., accessible through the Internet for content owned by a specific owner or group of owners to prevent further distribution. Finally, this mark can be used to prove ownership in case of a dispute.

Storing Robust Meta-Information

During long-term storage and archival, information stored with media can be lost either because it is deleted accidentally or because it cannot be read. Many embodiments of the invention are configured to store information concerning media using marks. Storing information using marks can enable the information to be retrieved after format change and does not require additional storage space.

Copy Control

In many embodiments, a strong mark that is machine readable can be embedded into media. The mark can then be used by a player to control playback and/or recording of the media. The player can uncover the mark and ascertain the authorizations required to play the media. If the player has the appropriate authorizations, then the player can play the media or refuse playback otherwise.

Broadcast Monitoring

Machine readable marks in accordance with embodiments of the present invention can also be embedded in media broadcast by a television or radio station. The machine readable marks can then be used by receiver devices to automatically record the content that was broadcast and to track the frequency and time of broadcast. The mark embedded in the media can be distinct for each work and broadcast.

Secret Communication

As mentioned above, marks can be used to transmit secret information using media. While the transmission of the media can be observed the fact that the media contain an additional mark is not obvious and can be used to transmit information without allowing others to observe that information is transmitted other than the media content.

Identification of Publicly Displayed Media

Media that are publicly displayed are frequently the subject of rerecording. In many embodiments, a mark is embedded in publicly displayed media that identifies the time and/or place of public display. Should the media be rerecorded during the public display, then the mark is embedded in the unauthorized rerecording and uncovering this information can be helpful in preventing future rerecording of publicly displayed media at the venue in which the rerecording was made.

Content Authentication

Digital media is not only used for entertainment purposes but also recorded for the purpose of documentation. This is an example where authentication of such media increases it value as evidence and credibility that it has not been modified. This is in particular important for digital media that can be manipulated easier than analogue content, since took are readily available and reproduction is flawless. Digital watermarks are used to embed a fragile message that is affected by many manipulations and if the watermark is not perfectly restored it can be concluded that the media has been manipulated.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of imperceptibly embedding information in a compressed video bitstream, comprising:
    analyzing the compressed bitstream using a pre-processor to identify locations that can be imperceptibly modified, where the imperceptible modification includes replacing original content using replacement content derived from elsewhere in the compressed bitstream to remove at least a portion of the original content;
    generating at least one piece of replacement data for each identified location using the pre-processor, where overwriting a portion of the compressed bitstream with any of the pieces of replacement data prevents a decoder from decoding original content and causes a decoder to decode replacement content derived from elsewhere in the compressed bitstream;
    selecting pieces of replacement data using an embedding device, wherein overwriting portions of the compressed bitstream using the selected pieces of replacement data encodes payload information in accordance with a predetermined coding scheme; and
    embedding the payload information in the compressed bitstream by using the embedding device to overwrite at least a portion of the compressed bitstream with the selected replacement data.

2. The method of claim 1, wherein the replacement data is stored on a physical media with the compressed video stream.

3. The method of claim 1, wherein the embedding device is a media server configured to transmit the compressed bitstream to a decoder, and the method further comprises:
    generating payload information using the media server, where the payload information is indicative of a decoder that requests the transmission of the compressed bitstream; and
    transmitting the compressed bitstream in which the payload information is embedded to the decoder using the media server.

4. The method of claim 1, wherein the embedding device is a decoder configured to receive the compressed bitstream and the replacement data, and the method further comprises:
    decoding the video in the compressed bitstream after the decoder has embedded the payload information; and
    outputting the decoded video to a rendering device using the decoder.

5. The method of claim 4, wherein the compressed bitstream received by the decoder includes the replacement data as part of the compressed bitstream.

6. The method of claim 4, wherein the replacement data is transmitted in a separate stream.

7. The method of claim 1, wherein the embedding device comprises a media server and a decoder, and the decoder selects the pieces of replacement data used to embed the payload information, and embedding the payload information in the compressed bitstream further comprises:
    overwriting portions of the compressed bitstream with portions from a plurality of the generated pieces of replacement data so that a decoder cannot decode the original content in the overwritten locations without perceptible errors;
    transmitting from the media server to the decoder the compressed bitstream, the original overwritten portions of the compressed bitstream and the portions of the generated pieces of replacement data that were not used by the media server in the overwriting of the compressed bitstream; and
    embedding the payload information in accordance with the predetermined coding scheme by:
    overwriting portions of the compressed bitstream using portions of the generated pieces of replacement data that were not used by the media server in the overwriting of the compressed bitstream, where the portions the decoder uses to overwrite the compressed bitstream are from the generated pieces of replacement data selected by the decoder; and
    overwriting portions of replacement data within the compressed bitstream using the original overwritten portions of the compressed bitstream, where the portions of replacement data within the compressed bitstream that are overwritten by the decoder are from the generated pieces of replacement data that were not selected by the decoder.

8. The method of claim 1, wherein analyzing the compressed bitstream using a pre-processor to identify locations that can be imperceptibly modified further comprises identifying portions of video frames from within the compressed bitstream that can be imperceptibly modified, where the imperceptible modification includes replacing a portion of the original content of the video frame using replacement content derived from other frames in the compressed bitstream.

9. The method of claim 1, wherein analyzing the compressed bitstream using a pre-processor to identify locations that can be imperceptibly modified further comprises identifying video frames that can be imperceptibly modified, where the imperceptible modification includes replacing the original content of the video frame using replacement content derived from at least one other frame within the compressed bitstream.

10. The method of claim 9, wherein the replacement content is derived from the content of the previous video frame within the compressed bitstream.

11. The method of claim 10, wherein the replacement content is the same as the content of the previous video frame.

12. The method of claim 10, wherein the replacement content is derived by adding delta additions to the content of the previous video frame.

13. The method of claim 9, wherein the replacement content is derived from the content of the subsequent video frame from within the compressed bitstream.

14. The method of claim 13, wherein the replacement content is the same as the content of the subsequent video frame.

15. The method of claim 13, wherein the replacement content is derived by adding delta additions to the content of the subsequent video frame.

16. The method of claim 9, wherein the replacement content is derived from the content of the previous and subsequent video frames from within the compressed stream.

17. The method of claim 16, wherein the replacement content is the average of the content of the previous and subsequent video frames.

18. The method of claim 16, wherein the replacement content is derived by adding delta additions to the average of the content of the previous and subsequent video frames.

19. The method of claim 1 where the replacement data and at least a portion of the compressed bitstream are encrypted using at least one common encryption key so that the encrypted compressed bitstream can be overwritten with replacement data and the compressed bitstream decrypted.

20. The method of claim 1, wherein the replacement data used to overwrite at least a portion of the compressed bitstream indicates how to derive the replacement content, and the method further comprises:
decoding the compressed bitstream in which the payload information is embedded using a decoder;
wherein decoding the compressed bitstream comprises deriving replacement content from elsewhere in the compressed bitstream in accordance with each of the pieces of replacement data encoding payload information in the compressed bitstream.

21. The method of claim 20, wherein the replacement data indicates how to derive a replacement video frame using at least one other video frame within the compressed bitstream.

22. The method of claim 1, wherein:
the compressed bitstream incorporates video frames that are not referenced by other video frames in the compressed bitstream; and
analyzing the compressed bitstream using a pre-processor to identify locations that can be imperceptibly modified further comprises:
locating the video frames that are not referenced by other video frames in the compressed bitstream using the pre-processor; and
identifying the video frames that are not referenced by other video frames in the compressed bitstream that can be imperceptibly modified using the pre-processor, where the imperceptible modification includes replacing at least a portion of the original content of the video frame using replacement content derived from at least one other frame within the compressed bitstream.

23. The method of claim 22, wherein identifying the video frames that are not referenced by other video frames in the compressed bitstream that can be imperceptibly modified further comprises calculating the difference between each decoded video frame that is not referenced by other video frames in the compressed bitstream and at least one decoded neighboring video frame within the compressed bitstream.

24. The method of claim 1, wherein analyzing the compressed bitstream using a pre-processor to identify locations that can be imperceptibly modified further comprises analyzing the compressed bitstream using a pre-processor to identify locations that can be imperceptibly modified without propagating errors to other locations in the compressed bitstream.

25. A method of imperceptibly embedding information in a compressed video bitstream, comprising:
analyzing the compressed bitstream using a pre-processor to identifying video frames that are not referenced by other video frames in the compressed bitstream and which can be imperceptibly modified without propagating errors to other locations in the compressed bitstream, where the imperceptible modification includes replacing the original content of the video frame using replacement content derived from at least one other frame within the compressed bitstream;
generating at least one piece of replacement data for each identified video frame using the pre-processor, where overwriting a portion of the compressed bitstream with any of the pieces of replacement data prevents a decoder from decoding the original content of the identified video frame and causes a decoder to derive a replacement frame from at least one other frame within the compressed bitstream in a manner indicated by the replacement data;
selecting pieces of replacement data using an embedding device, wherein overwriting the compressed bitstream using each of the selected pieces of replacement data replaces an entire frame and encodes payload information in accordance with a predetermined coding scheme; and
embedding the payload information in the compressed bitstream by using the embedding device to overwrite at least a portion of the compressed bitstream with the selected replacement data.

26. The method of claim 25, wherein identifying the video frames that are not referenced by other video frames in the compressed bitstream that can be imperceptibly modified without propagating errors to other locations in the compressed bitstream further comprises calculating the difference between each decoded video frame that is not referenced by other video frames in the compressed bitstream and at least one decoded neighboring video frame within the compressed bitstream.

27. The method of claim 25, wherein the replacement data indicates that the replacement frame is derived by averaging the content of the previous and subsequent video frames from within the compressed stream.

28. A method of extracting payload information embedded in a copy of a marked bitstream, where the marked bitstream is derived by overwriting portions of the original bitstream using pieces of replacement data selected in accordance with a predetermined coding scheme to imperceptibly embed the payload information, and the selected replacement data removes at least a portion of the original content and causes a decoder to decode replacement content derived from elsewhere in the marked bitstream, the method comprising:
inspecting the copy of the marked bitstream to estimate the locations within the original bitstream that were overwritten using an extraction device; and
extracting the payload information embedded in the copy of the compressed bitstream based upon the predetermined coding scheme, and the estimates of the locations within the original bitstream that were overwritten using the extraction device.

29. The method of claim 28, wherein extracting the payload information embedded in the copy of the compressed bitstream based upon the predetermined coding scheme, and the estimates of the locations within the original bitstream that were overwritten using the extraction device further comprises comparing the content of the original compressed bitstream to the content of the copy of the compressed bitstream using the extraction device.

30. The method of claim 28, wherein:
each piece of replacement data replaces the original content of a video frame using replacement content derived from at least one other frame within the marked bitstream; and
inspecting the copy of the marked bitstream to estimate the locations within the original bitstream that were overwritten using an extraction device further comprises:
comparing each of a plurality of video frames in the copy of the marked bitstream to at least one other frame in the copy of the marked bitstream to determine the probability that each of the plurality of video frames is derived from at least one other video frame within the marked bitstream; and
estimating the locations within the original bitstream that were overwritten based upon the probabilities.

31. The method of claim 30, wherein:
the replacement content is derived from the previous frame from the original bitstream; and
each of the plurality of video frames is compared to its previous frame by the extraction device.

32. The method of claim 30, wherein:
the replacement content is derived from the subsequent frame from the original bitstream; and
each of the plurality of video frames is compared to its subsequent frame by the extraction device.

33. The method of claim 30, wherein:
the replacement content is derived from a combination of the previous and a subsequent frames from the original bitstream; and
each of the plurality of video frames is compared to the combination of its previous and a subsequent frames by the extraction device.

34. A system configured to pre-process a compressed video bitstream to identify frames that can be imperceptibly modified to embed information in the compressed bitstream, comprising:
a pre-processor configured to communicate with a storage device;
wherein the pre-processor is configured to:
receive the compressed bitstream;
analyze the compressed bitstream to identify locations that can be imperceptibly modified, where the imperceptible modification includes replacing original content using replacement content derived from elsewhere in the compressed bitstream to remove at least a portion of the content;
generate at least one piece of replacement data for each identified location, where overwriting a portion of the compressed bitstream with any of the pieces of replacement data prevents a decoder from decoding original content and causes a decoder to decode replacement content derived from elsewhere in the compressed bitstream; and
store the replacement data corresponding to each identified location on the storage device.

35. A system configured to imperceptibly embed payload information in a compressed bitstream using pre-processed replacement data associated with identified locations within the compressed bitstream, where overwriting a portion of the compressed bitstream with any of the pieces of replacement data prevents a decoder from decoding original content and causes a decoder to decode replacement content derived from elsewhere in the compressed bitstream, the system comprising:
an embedding device configured to receive the compressed bitstream and the pre-processed replacement data;
wherein the embedding device is configured to select pieces of pre-processed replacement data, wherein overwriting portions of the compressed bitstream using the selected pieces of replacement data encodes payload information in accordance with a predetermined coding scheme; and
wherein the embedding device is configured to embed the payload information in the compressed bitstream by using the embedding device to overwrite at least a portion of the compressed bitstream with the selected replacement data.

* * * * *